United States Patent
Hsu et al.

(10) Patent No.: US 7,197,072 B1
(45) Date of Patent: Mar. 27, 2007

(54) SYSTEMS AND METHODS FOR RESETTING RATE CONTROL STATE VARIABLES UPON THE DETECTION OF A SCENE CHANGE WITHIN A GROUP OF PICTURES

(75) Inventors: Kuo-Wei Hsu, San Lorenzo, CA (US); Ioannis Katsavounidis, Palo Alto, CA (US)

(73) Assignee: Intervideo, Inc., Fremont, CA (US)

( * ) Notice: Subject to any disclaimer, the term of this patent is extended or adjusted under 35 U.S.C. 154(b) by 596 days.

(21) Appl. No.: 10/452,799

(22) Filed: May 30, 2003

Related U.S. Application Data

(60) Provisional application No. 60/403,851, filed on Aug. 14, 2002, provisional application No. 60/384,568, filed on May 30, 2002.

(51) Int. Cl.
  *H04N 7/18* (2006.01)
(52) U.S. Cl. .......................... 375/240.02; 375/240.03; 375/240.04
(58) Field of Classification Search . 375/240.01–240.2
  See application file for complete search history.

(56) References Cited

U.S. PATENT DOCUMENTS

| | | | | |
|---|---|---|---|---|
| 5,717,464 A | * | 2/1998 | Perkins et al. | 375/240.05 |
| 6,535,251 B1 | * | 3/2003 | Ribas-Corbera | 375/240.03 |
| 6,563,549 B1 | * | 5/2003 | Sethuraman | 348/700 |

OTHER PUBLICATIONS

U.S. Appl. No. 10/452,836, filed May 30, 2003, Ding et al.
U.S. Appl. No. 10/452,768, filed May 30, 2003, Katsavounidis et al.
U.S. Appl. No. 10/449,436, filed May 30, 2003, Hsu et al.
U.S. Appl. No. 10/452,794, filed May 30, 2003, Katsavounidis et al.
U.S. Appl. No. 10/452,793, filed May 30, 2003, Zhao et al.
U.S. Appl. No. 10/642,107, Aug. 14, 2003, Katsavounidis et al.
U.S. Appl. No. 10/642,396, Aug. 14, 2003, Zhao et al.
"Rate Control and Quantization Control" [online], [retrieved on Apr. 28, 2003] in *Test Model 5*. MPEG Software Simulation Group (MSSG). Retrieved from the Internet: <URL: http:\\www.mpeg.org/MPEG/MSSG/tm5/Ch10/Ch10.html>, pp. 1-5.
Abel, J., Balasubramanian, K, Bargeron, M, Craver, T., and Phlipot, M., "Applications Tuning for Streaming SIMD Extensions" [online], [retrieved on May 14, 2003]. *Intel Technology Journal Q2*, 1999. Intel Corporation. Retrieved from the Internet: <http://www.intel.com/technology/itj/Q21999/PDF/apps_simd.pdf>, pp. 1-13.
Thakkar, S. and Huff, T., "The Internet Streaming SMD Extensions" [online], [retrieved on May 14, 2003]. *Intel Technology Journal Q2*, 1999. Intel Corporation, Retrieved from the Internet: <URL: http://www.intel.com/technology/itj/q21999/pdf/simd_ext.pdf>, pp. 1-8.
Fogg, C., "MPEG-2 FAQ" [online], [retrieved on Apr. 28, 2003]. Retrieved from the Internet: <URL: http://bmrc.berkeley.edu/research/mpeg/faq/mpeg2-v38/faq_v38.html>, pp. 1-40.

* cited by examiner

*Primary Examiner*—Andy Rao
(74) *Attorney, Agent, or Firm*—Rosenberg, Klein & Lee

(57) ABSTRACT

The invention is related to methods and apparatus that advantageously improve picture quality in a video encoder, such as an MPEG video encoder. Scene changes typically occur relatively frequently in picture sequences, such as movies. One embodiment of the invention detects a scene change within a group of pictures and allocates bits within the group of pictures in response to the detected scene change without changing a predetermined structure for the group of pictures.

14 Claims, 14 Drawing Sheets

PRESENTATION ORDER
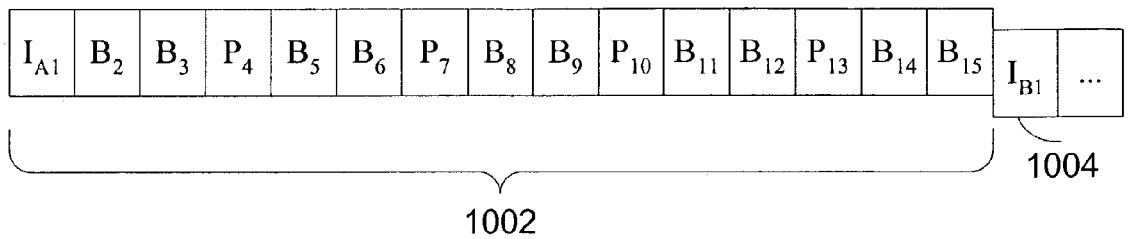
ENCODING ORDER, FIRST GROUP OF PICTURES
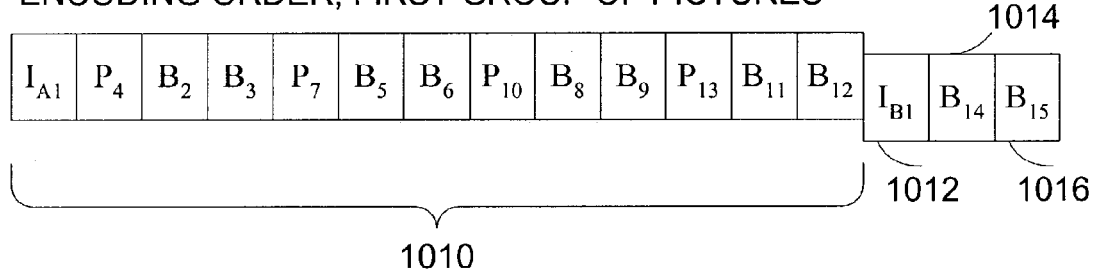
ENCODING ORDER, ONGOING GROUP OF PICTURES
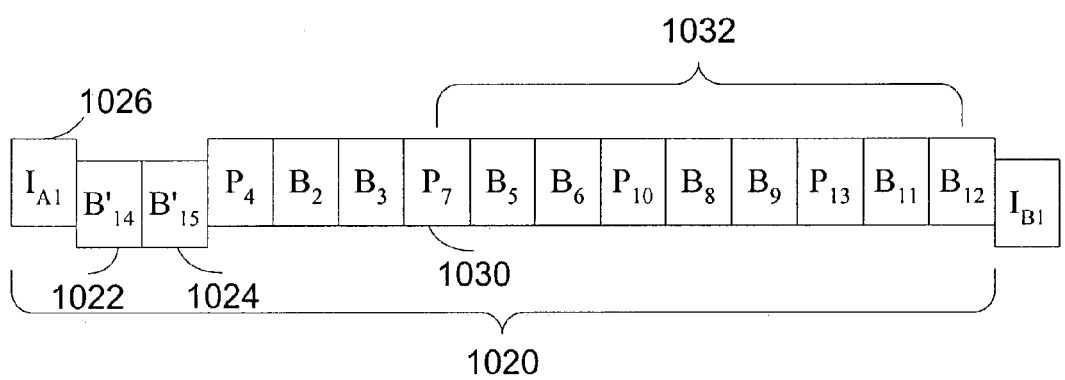
FIG. 10A

SYSTEMS AND METHODS FOR RESETTING RATE CONTROL STATE VARIABLES UPON THE DETECTION OF A SCENE CHANGE WITHIN A GROUP OF PICTURES

RELATED APPLICATION

This application claims the benefit under 35 U.S.C. § 119(e) of U.S. Provisional Application No. 60/384,568, filed May 30, 2002, and U.S. Provisional Application No. 60/403,851, filed Aug. 14, 2002, the entireties of which are hereby incorporated by reference.

APPENDIX A

Appendix A, which forms a part of this disclosure, is a list of commonly owned copending U.S. patent applications. Each one of the applications listed in Appendix A is hereby incorporated herein in its entirety by reference thereto.

BACKGROUND OF THE INVENTION

1. Field of the Invention

The invention generally relates to video encoding techniques. In particular, the invention relates to resetting parameters in response to a scene change within a group of pictures (GOP).

2. Description of the Related Art

A variety of digital video compression techniques have arisen to transmit or to store a video signal with a lower data rate or with less storage space. Such video compression techniques include international standards, such as H.261, H.263, H.263+, H.263++, H.264, MPEG-1, MPEG-2, MPEG-4, and MPEG-7. These compression techniques achieve relatively high compression ratios by discrete cosine transform (DCT) techniques and motion compensation (MC) techniques, among others. Such video compression techniques permit video data streams to be efficiently carried across a variety of digital networks, such as wireless cellular telephony networks, computer networks, cable networks, via satellite, and the like, and to be efficiently stored on storage mediums such as hard disks, optical disks, Video Compact Discs (VCDs), digital video discs (DVDs), and the like. The encoded data streams are decoded by a video decoder that is compatible with the syntax of the encoded data stream.

For relatively high image quality, video encoding can consume a relatively large amount of data. However, the communication networks that carry the video data can limit the data rate that is available for encoding. For example, a data channel in a direct broadcast satellite (DBS) system or a data channel in a digital cable television network typically carries data at a relatively constant bit rate (CBR) for a programming channel. In addition, a storage medium, such as the storage capacity of a disk, can also place a constraint on the number of bits available to encode images.

As a result, a video encoding process often trades off image quality against the number of bits used to compress the images. Moreover, video encoding can be relatively complex. For example, where implemented in software, the video encoding process can consume relatively many CPU cycles. Further, the time constraints applied to an encoding process when video is encoded in real time can limit the complexity with which encoding is performed, thereby limiting the picture quality that can be attained.

One conventional method for rate control and quantization control for an encoding process is described in Chapter 10 of Test Model 5 (TM5) from the MPEG Software Simulation Group (MSSG). TM5 suffers from a number of shortcomings. An example of such a shortcoming is that TM5 does not guarantee compliance with Video Buffer Verifier (VBV) requirement. As a result, overrunning and underrunning of a decoder buffer can occur, which undesirably results in the freezing of a sequence of pictures and the loss of data.

SUMMARY OF THE INVENTION

The invention is related to methods and apparatus that advantageously improve picture quality in a video encoder, such as an MPEG video encoder. Scene changes typically occur relatively frequently in picture sequences, such as movies. One embodiment of the invention detects a scene change within a group of pictures and allocates bits within the group of pictures in response to the detected scene change without changing a predetermined structure for the group of pictures.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 10A illustrates examples of groups of pictures (GOPs).

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention. Accordingly, the scope of the invention is defined only by reference to the appended claims.

Figure 1:
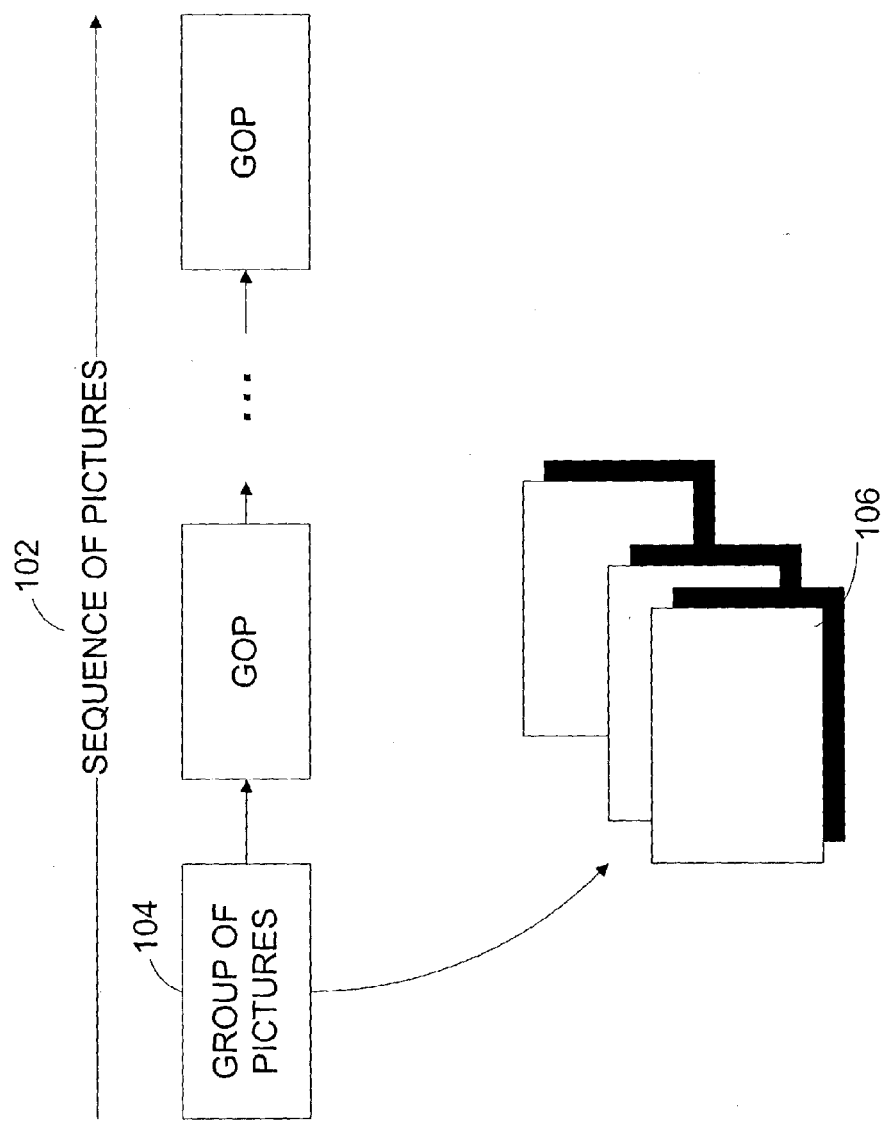
FIG. 1 illustrates an example of a sequence of pictures.

FIG. 1 illustrates a sequence of pictures 102. While embodiments of the invention are described in the context of MPEG-2 and pictures, the principles and advantages described herein are also applicable to other standards including H.261, H.263, MPEG-1, and MPEG-4. The term "picture" will be used herein to encompass pictures, images, frames, visual object planes (VOPs), and the like. A video sequence includes multiple video images usually taken at periodic intervals. The rate at which the pictures or frames are displayed is referred to as the picture rate or frame rate. The pictures in a sequence of pictures can correspond to either interlaced images or to non-interlaced images, i.e., progressive images. In an interlaced image, each image is made of two separate fields, which are interlaced together to create the image. No such interlacing is performed in a non-interlaced or progressive image.

The sequence of pictures 102 can correspond to a movie or other presentation. It will be understood that the sequence of pictures 102 can be of finite duration, such as with a movie, or can be of unbound duration, such as for a media channel in a direct broadcast satellite (DBS) system. An example of a direct broadcast satellite (DBS) system is known as DIRECTV®. As shown in FIG. 1, the pictures in the sequence of pictures 102 are grouped into units known as groups of pictures such as the illustrated first group of pictures 104. A first picture 106 of the first group of pictures 104 corresponds to an I-picture. The other pictures in the group of pictures can correspond to P-pictures or to B-pictures.

In MPEG-2, a picture is further divided into smaller units known as macroblocks. It will be understood that in other video standards, such as MPEG-4, a picture can be further divided into other units, such as visual object planes (VOPs). Returning now to MPEG-2, an I-picture is a picture in which all macroblocks are intra coded, such that an image can be constructed without data from another picture. A P-picture is a picture in which all the macroblocks are either intra coded or forward predictively coded. The macroblocks for a P-picture can be encoded or decoded based on data for the picture itself, i.e., intra coded, or based on data from a picture that is earlier in the sequence of pictures, i.e., forward predictively coded. A B-picture is a picture in which the macroblocks can be intra coded, forward predictively coded, backward predictively coded, or a combination of forward and backward predictively coded, i.e., interpolated. During an encoding and/or a decoding process for a sequence of pictures, the B-pictures will typically be encoded and/or decoded after surrounding I-pictures and/or P-pictures are encoded and/or decoded. An advantage of using predictively-coded macroblocks over intra-coded macroblocks is that the number of bits used to encode predictively-coded macroblocks can be dramatically less than the number of bits used to encode intra-coded macroblocks.

The macroblocks include sections for storing luminance (brightness) components and sections for storing chrominance (color) components. It will be understood by one of ordinary skill in the art that the video data stream can also include corresponding audio information, which is also encoded and decoded.

Figure 2:
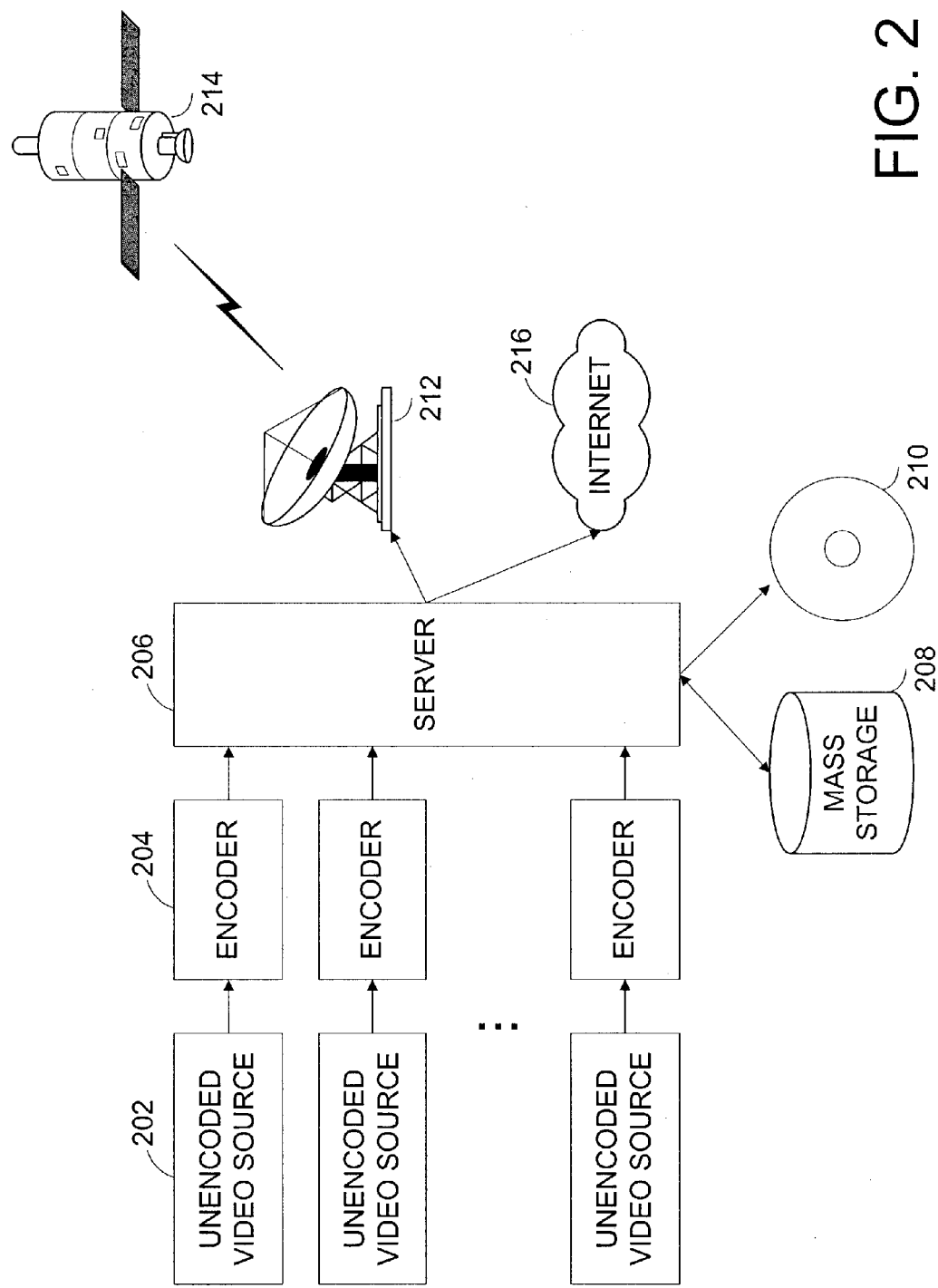
FIG. 2 illustrates an example of an encoding environment in which an embodiment of the invention can be used.

FIG. 2 illustrates an example of an encoding environment in which an embodiment of the invention can be used. A source for unencoded video 202 provides the unencoded video as an input to an encoder 204. The source for unencoded video 202 can be embodied by a vast range of devices, such as, but not limited to, video cameras, sampled video tape, sampled films, computer-generated sources, and the like. The source for unencoded video 202 can even include a decoder that decodes encoded video data. The source for unencoded video 202 can be external to the encoder 204 or can be incorporated in the same hardware as the encoder 204. In another example, the source for unencoded video 202 is a receiver for analog broadcast TV signals that samples the analog images for storage in a digital video recorder, such as a set-top box known as TiVo®.

The encoder 204 can also be embodied in a variety of forms. For example, the encoder 204 can be embodied by dedicated hardware, such as in an application specific integrated circuit (ASIC), by software executing in dedicated hardware, or by software executing in a general-purpose computer. The software can include instructions that are embodied in a tangible medium, such as a hard disk or optical disk. In addition, the encoder 204 can be used with other encoders to provide multiple encoded channels for use in direct broadcast satellite (DBS) systems, digital cable networks, and the like. For example, the encoded output of the encoder 204 is provided as an input to a server 206 together with the encoded outputs of other encoders as illustrated in FIG. 2. The server 206 can be used to store the encoded sequence in mass storage 208, in optical disks such as a DVD 210 for DVD authoring applications, Video CD (VCD), and the like. The server 206 can also provide the data from the encoded sequence to a decoder via an uplink 212 to a satellite 214 for a direct broadcast satellite (DBS) system, to the Internet 216 for streaming of the encoded sequence to remote users, and the like. It will be understood that an encoded sequence can be distributed in a variety of other mediums including local area networks (LANs), other types of wide area networks (WANs), wireless networks, terrestrial digital broadcasts of television signals, cellular telephone networks, dial-up networks, peer-to-peer networks, and the like. In one embodiment, the encoder 204 encodes the sequence of pictures in real time. In another embodiment, the encoder 204 encodes the sequence of pictures asynchronously. Other environments in which the encoder 204 can be incorporated include digital video recorders, digital video cameras, dedicated hardware video encoders and the like.

Figure 3:
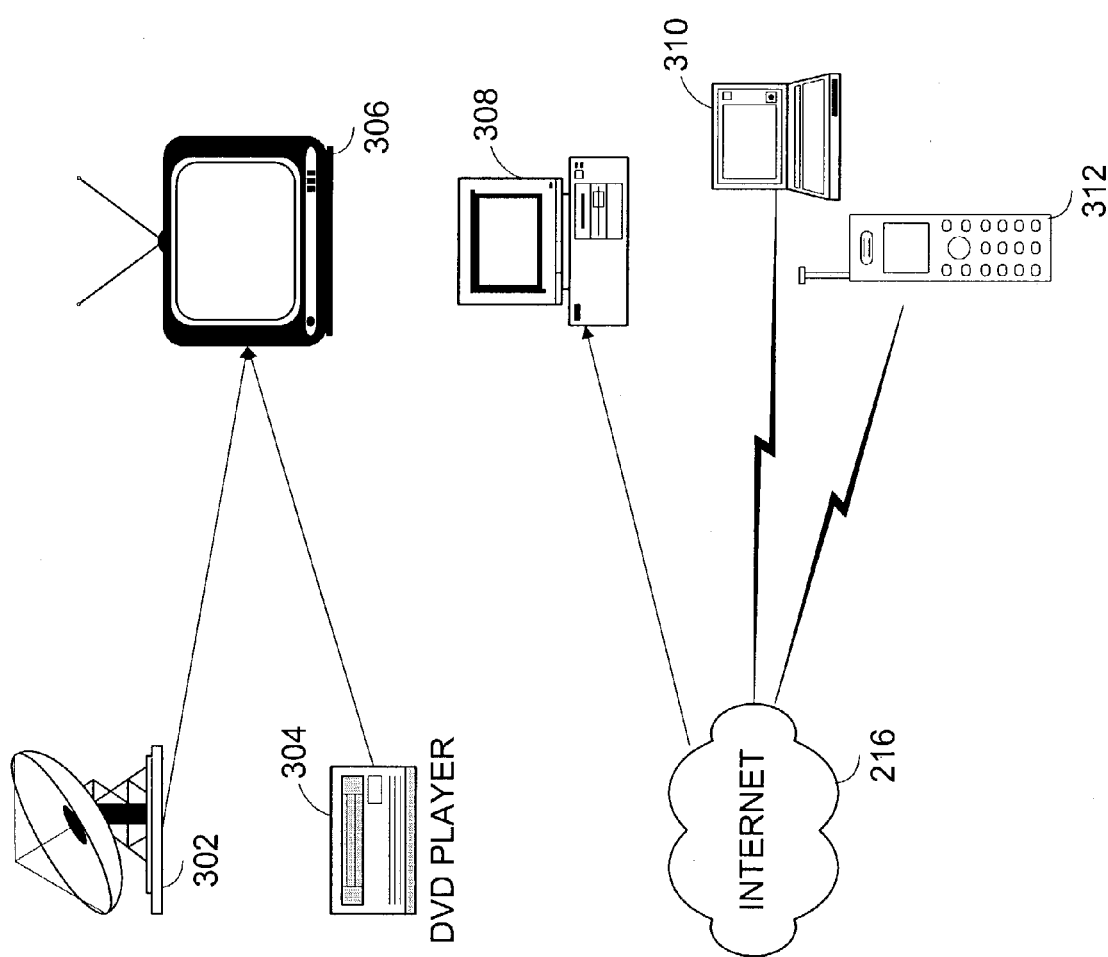
FIG. 3 illustrates an example of decoding environments, which can include a decoder buffer.

FIG. 3 illustrates an example of decoding environments, which include decoder buffers that are modeled during the encoding process by a Video Buffer Verifier (VBV) buffer. An encoded sequence of pictures can be decoded and viewed in a wide variety of environments. Such environments include reception of direct broadcast satellite (DBS) signals via satellite dishes 302 and set top boxes, playback by digital video recorders, playback through a DVD player 304, reception of terrestrial digital broadcasts, and the like. For example, a television set 306 can be used to view the images, but it will be understood that a variety of display devices can be used.

For example, a personal computer 308, a laptop computer 310, a cell phone 312, and the like can also be used to view the encoded images. In one embodiment, these devices are configured to receive the video images via the Internet 216.

The Internet 216 can be accessed via a variety of networks, such as wired networks and wireless networks.

Figure 4:
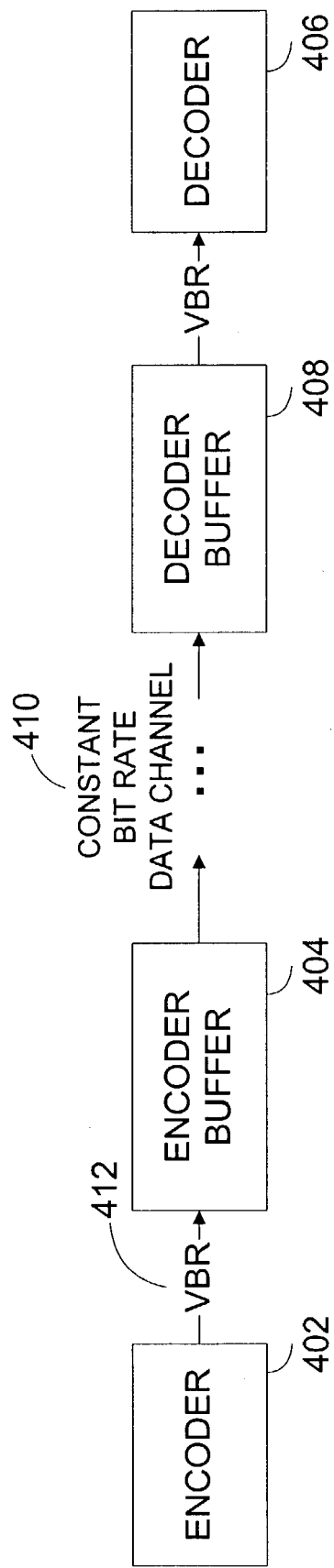
FIG. 4 is a block diagram that generally illustrates the relationship between an encoder, a decoder, data buffers, and a constant-bit-rate data channel.

FIG. 4 is a block diagram that generally illustrates the relationship between an encoder 402, an encoder buffer 404, a decoder 406, a decoder buffer 408, and a constant-bit-rate data channel 410. In another embodiment, the bit rate of the constant-bit-rate data channel can vary slightly from channel-to-channel depending on a dynamic allocation of data rates among multiplexed data channels. For the purposes of this application, this nearly constant bit rate with a slight variation in data rate that can occur as a result of a dynamic allocation of data rate among multiplexed data channels will be considered as a constant bit rate. For example, the encoder 402 can correspond to an encoder for a programming channel in a direct broadcast satellite (DBS) system, and the decoder 406 can correspond to a decoder in a set-top box that receives direct broadcast satellite (DBS) signals. The skilled practitioner will appreciate that the data rate of the constant-bit-rate data channel 410 for actual video data may be less than the data rate of the constant-bit-rate data channel 410 itself because some of the actual transmission data may be occupied for overhead purposes, such as for error correction and for packaging of data. The skilled practitioner will appreciate that the methods described herein are directly applicable to constant-bit-rate encoding, as described in the MPEG standard document, but also to variable-bit-rate encoding. For the case of variable bit-rate, the transmission bit rate can be described in terms of a long-term average over a time period that can be a few seconds, a few minutes, a few hours, or any other suitable time-interval, together with a maximal bit rate that can be used to provide data to a decoder buffer. Data can be provided from the channel to the decoder buffer at the maximal bit rate until the decoder buffer is full; at that point, the data channel waits for decoding of the next picture, which will remove some data from the decoder buffer, and then transfer of data from the channel to the decoder buffer resumes. The term "bit rate" used hereafter can be either some constant bit rate or a long-term average of variable bit rate encoding. In one embodiment of a constant bit rate encoder, the encoder produces a data stream with a relatively constant bit rate over a group of pictures.

For streaming applications such as a direct broadcast satellite (DBS) system or for recording of live broadcasts such as in a home digital video recorder, the encoder 402 receives and encodes the video images in real time. The output of the encoder 402 can correspond to a variable bit rate (VBR) output 412. The variable bit rate (VBR) output 412 of the encoder 402 is temporarily stored in the encoder buffer 404. A function of the encoder buffer 404 and the decoder buffer 408 is to hold data temporarily such that data can be stored and retrieved at different data rates. It should be noted that the encoder buffer 404 and the decoder buffer 408 do not need to be matched, and that the encoder buffer 404 is a different buffer than a video buffer verifier (VBV) buffer, which is used by the encoder 402 to model the occupancy of the decoder buffer 408 during the encoding process.

The encoder buffer 404 can be implemented in dedicated memory or can be efficiently implemented by sharing system memory, such as the existing system memory of a personal computer. Where the memory used for the encoder buffer 404 is shared, the encoder buffer 404 can be termed a "virtual buffer." It will be understood that larger memories, such as mass storage, can also be used to store video data streams and portions thereof.

The encoder buffer 404 buffers the relatively short-term fluctuations of the variable bit rate (VBR) output 412 of the encoder 402 such that the encoded data can be provided to the decoder 406 via the constant-bit-rate data channel 410. Similarly, the decoder buffer 408 can be used to receive the encoded data at the relatively constant bit rate of the constant-bit-rate data channel 410 and provide the encoded data to the decoder 406 as needed, which can be at a variable bit rate. The decoder buffer 408 can also be implemented in dedicated memory or in a shared memory, such as the system memory of a personal computer. Where implemented in a shared memory, the decoder buffer 408 can also correspond to a virtual buffer.

The MPEG standards specify a size for the decoder buffer 408. The size of the decoder buffer 408 is specified such that an MPEG-compliant data stream can be reliably decoded by a standard decoder. In the MPEG-2 standard, which for example is used in the encoding of a DVD, the buffer size specified is about 224 kB. In the MPEG-1 standard, which for example is used in the encoding of a video compact disc (VCD), the buffer size is specified to be about 40 kB. It will be understood by one of ordinary skill in the art that the actual size of the encoder buffer 404 and/or the decoder buffer 408 can be determined by a hardware designer or by a software developer by varying from the standard.

Although it will be understood that the actual size of the decoder buffer 408 can vary from standard, there exist practical limitations that affect the size and occupancy of the decoder buffer 408. When the size of the decoder buffer 408 is increased, this can correspondingly increase the delay encountered when a sequence is selected and playback is initiated. For example, when a user changes the channel of a direct broadcast satellite (DBS) set-top box or skips forwards or backwards while viewing a DVD, the retrieved data is stored in the decoder buffer 408 before it is retrieved by the decoder 406 for playback. When the decoder buffer 408 is of a relatively large size, this can result in an infuriatingly long delay between selection of a sequence and playback of the sequence. Moreover, as will be described later in connection with FIG. 5, the encoded data can specify when playback is to commence, such that playback can begin before the decoder buffer 408 is completely full of data.

In one embodiment, playback of a sequence begins upon the earlier of two conditions. A first condition is a time specified by the MPEG data stream. A parameter that is carried in the MPEG data stream known as vbv-delay provides an indication of the length of time that data for a sequence should be buffered in the decoder buffer 408 before the initiation of playback by the decoder 406. The vbv-delay parameter corresponds to a 16-bit number that ranges from 0 to 65,535. The value for the vbv-delay parameter is counted down by the decoder 406 by a 90 kHz clock signal such that the amount of time delay specified by the vbv-delay parameter corresponds to the value divided by 90,000. For example, the maximum value for the vbv-delay of 65,535 thereby corresponds to a time delay of about 728 milliseconds (mS). It will be understood that the vbv-delay can initiate playback of the sequence at a time other than when the decoder buffer 408 is full so that even if the decoder buffer 408 is relatively large, the occupancy of the decoder buffer 408 can be relatively low.

A second condition corresponds to the filling of the decoder buffer 408. It will be understood that if data continues to be provided to the decoder buffer 408 after the decoder buffer 408 has filled and has not been emptied, that some of the data stored in the decoder buffer 408 will typically be lost. To prevent the loss of data, the decoder 406 can initiate playback at a time earlier than the time specified by the vbv-delay parameter. For example, when the size of the decoder buffer 408 corresponds to the specified 224 kB buffer size, bit-rates that exceed 2.52 Mega bits per second (Mbps) can fill the decoder buffer 408 in less time than the maximum time delay specified by the vbv-delay parameter.

The concept of the VBV buffer in the MPEG specification is intended to constrain the MPEG data stream such that decoding of the data stream does not result in an underrun or an overrun of the decoder buffer 408. It will be understood that the VBV buffer model does not have to be an actual buffer and does not actually have to store data. However, despite the existence of the VBV buffer concept, the video encoding techniques taught in MPEG's Test Model 5 (TM5) do not guarantee VBV compliance, and buffer underrun and overrun can occur.

Buffer underrun of the decoder buffer 408 occurs when the decoder buffer 408 runs out of data. This can occur when the bit rate of the constant-bit-rate data channel 410 is less than the bit rate at which data is consumed by the decoder 406 for a relatively long period of time. This occurs when the encoder 402 has used too many bits to encode the sequence relative to a specified bit rate. A visible artifact of buffer underrunning in the decoder buffer 408 is a temporary freeze in the sequence of pictures.

Buffer overrun of the decoder buffer 408 occurs when the decoder buffer 408 receives more data than it can store. This can occur when the bit rate of the constant-bit-rate data channel 410 exceeds the bit rate consumed by the decoder 406 for a relatively long period of time. This occurs when the encoder 402 has used too few bits to encode the sequence relative to the specified bit rate. As a result, the decoder buffer 408 is unable to store all of the data that is provided from the constant-bit-rate data channel 410, which can result in a loss of data. This type of buffer overrun can be prevented by "bit stuffing," which is the sending of data that is not used by the decoder 406 so that the number of bits used by the decoder 406 matches with the number of bits sent by the constant-bit-rate data channel 410 over a relatively long period of time. However, bit stuffing can introduce other problems as described in greater detail later in connection with FIGS. 9A and 9B.

The VBV buffer model concept is used by the encoder 402 in an attempt to produce a video data stream that will preferably not result in buffer underrun or overrun in the decoder buffer 408. In one embodiment, the occupancy levels of the VBV buffer model are monitored to produce a video data stream that does not result in buffer underrun or overrun in the decoder buffer 408. It should be noted that overrun and underrun in the encoder buffer 404 and in the decoder buffer 408 are not the same. For example, the conditions that result in a buffer underrun in the decoder buffer 408, i.e., an encoded bit rate that exceeds the bit rate of the constant-bit-rate data channel 410 for a sustained period of time, can also result in buffer overrun in the encoder buffer 404. Further, the conditions that result in a buffer overrun in the decoder buffer 408, i.e., an encoded bit rate that is surpassed by the bit rate of the constant-bit-rate data channel 410 for a sustained period of time, can also result in a buffer underrun in the encoder buffer 404.

Figure 5:
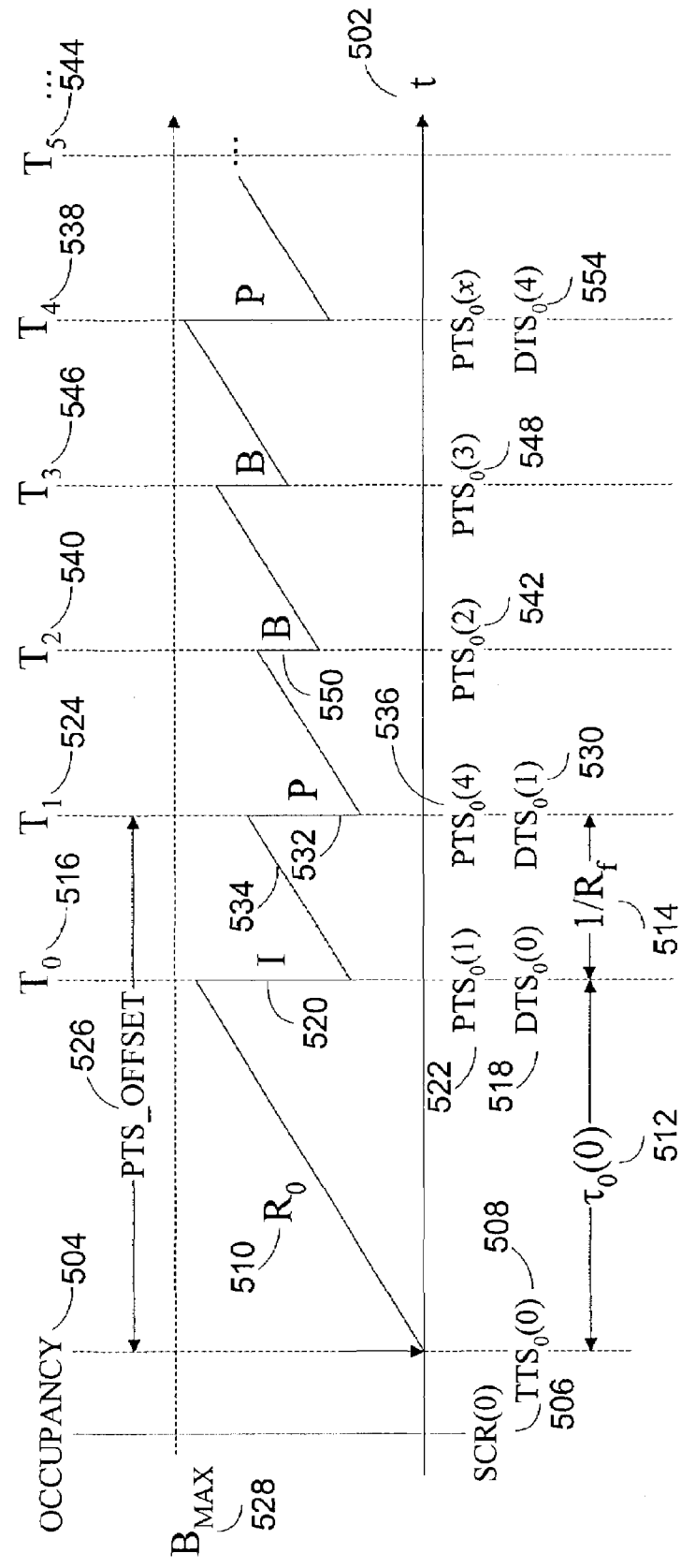
FIG. 5 is a chart that generally illustrates buffer occupancy as a function of time, as data is provided to a buffer at a constant bit rate while the data is consumed by the decoder at a variable bit rate.

FIG. 5 is a chart that generally illustrates decoder buffer occupancy as data is provided to a decoder buffer at a constant bit rate while data is consumed by a decoder at a variable bit rate. In a conventional system based on MPEG TM5, the data stream provided to the decoder disadvantageously does not guarantee that the decoder buffer is prevented from buffer underrun or overrun conditions. In the illustrated example, the data is provided to the decoder buffer at a constant bit rate and the decoder uses the data to display the video in real time.

Time (t) 502 is indicated along a horizontal axis. Increasing time is indicated towards the right. Decoder buffer occupancy 504 is indicated along a vertical axis. In the beginning, the decoder buffer is empty. A maximum level for the buffer is represented by a $B_{MAX}$ 528 level. An encoder desirably produces a data stream that maintains the data in the buffer below the $B_{MAX}$ 528 level and above an empty level. For example, the decoder buffer can be flushed in response to a skip within a program, in response to changing the selected channel in a direct broadcast satellite (DBS) system or in a digital cable television network, and the like. The decoder monitors the received data for a system clock reference (SCR), as indicated by SCR(0) 506. The system clock reference (SCR) is a time stamp for a reference clock that is embedded into the bit stream by the encoder and is used by the decoder to synchronize time with the time stamps for video information that are also embedded in the bit stream. The time stamps indicate when video information should be decoded, indicate when the video should be displayed, and also permit the synchronization of visual and audio samples.

An example of a picture type pattern that is commonly used in real-time video encoding is a presentation order with a repeating pattern of IBBPBBPBBPBBPBB. Despite the fact that I-pictures consume relatively large amounts of data, the periodic use of I-pictures is helpful for example, to permit a picture to be displayed in a relatively short period of time after a channel change in a DBS system.

The picture presentation or display order can vary from the picture encoding and decoding order. B-pictures depend on surrounding I- or P-pictures and not from other B-pictures, so that I- or P-pictures occurring after a B-picture in a presentation order will often be encoded, transmitted, and decoded prior to the encoding, transmitting, and decoding of the B-picture. For example, the relatively small portion of the sequence illustrated in FIG. 5 includes data for pictures in the order of IPBBP, as a P-picture from which the B-pictures depend is typically encoded and decoded prior to the encoding and decoding of the B-pictures, even though the pictures may be displayed in an order of IBBPBBPBBPBBPBB. It will be understood that audio data in the video presentation will typically not be ordered out of sequence. Table I summarizes the activity of the decoder with respect to time. For clarity, the illustrated GOP will be described as having only the IPBBP pictures and it will be understood that GOPs will typically include more than the five pictures described in connection with FIG. 5.

TABLE I

| time | activity |
| --- | --- |
| <$T_0$ | data accumulates in the buffer |
| $T_0$ | I-picture is decoded |
| $T_1$ | I-picture is presented, first P-picture is decoded |
| $T_2$ | first B-picture is decoded and presented |
| $T_3$ | second B-picture is decoded and presented |
| $T_4$ | first P-picture is presented, second P-picture is decoded |

In one embodiment, the decoder buffer ignores data until a picture header with a presentation time stamp (PTS) for an I-frame is detected. This time is indicated by a time $TTS_0(0)$ 508 in FIG. 5. This bypassing of data prevents the buffering of data for part of a picture or frame or the buffering of data that cannot be decoded by itself. After the time $TTS_0(0)$ 508, the decoder buffer begins to accumulate data as indicated by the ramp $R_0$ 510.

For a time period $\tau_0(0)$ 512, the decoder buffer accumulates the data before using the data. This time period $\tau_0(0)$ 512 is also known as a pre-loading delay. Along the top of FIG. 5 are references for time that are spaced approximately evenly apart with a picture period equal to the inverse of the frame rate or inverse of the picture rate $(1/R_f)$ 514. As will be described later, the location in time for the pictures can be indicated by time stamps for the corresponding pictures. At a time $T_0$ 516, the decoder retrieves an amount of data corresponding to the first picture of a group of pictures (GOP), which is an I-picture. The data stream specifies the time to decode the I-picture in a decoding time stamp (DTS), which is shown as a time stamp $DTS_0(0)$ 518 and specifies the time $T_0$ 516.

The retrieval of data corresponding to the I-picture is indicated by the relatively sharp decrease 520 in decoder buffer occupancy. For clarity, the extraction of data from the decoder buffer is drawn as occurring instantaneously, but it will be understood by one of ordinary skill in the art that a relatively small amount of time can be used to retrieve the data. Typically, I-pictures will consume a relatively large amount of data, P-pictures will consume a relatively smaller amount of data, and B-pictures will consume a relatively small amount of data. However, the skilled practitioner will appreciate that intra macroblocks, which consume a relatively large amount of data, can be present in P-pictures and in B-pictures, as well as in I-pictures, such that P-pictures and B-pictures can also consume relatively large amounts of data. The I-picture that is decoded at the time $T_0$ 516 is not yet displayed at the time $T_0$ 516, as a presentation time stamp $PTS_0(1)$ 522 specifies presentation at a time $T_1$ 524.

At the time $T_1$ 524, the decoder displays the picture corresponding to the I-picture that was decoded at the time $T_0$ 516. The time period PTS_OFFSET 526 illustrates the delay from the start of accumulating data in the decoder buffer for the selected sequence to the presentation of the first picture. A decoding time stamp $DTS_0(1)$ 530 instructs the decoder to decode the first P-picture in the sequence at the time $T_1$ 524. The extraction of data from the decoder buffer is illustrated by a decrease 532 in buffer occupancy. In between the time $T_0$ 516 to the time $T_1$ 524, the decoder buffer accumulates additional data as shown by a ramp 534. A presentation time stamp $PTS_0(4)$ 536 instructs the decoder to display the first P-picture at a time $T_4$ 538. In this example, the first P-picture is decoded earlier than it is presented such that the B-pictures, which can include backward predictively, forward predictively, or even bi-directionally predictively coded macroblocks, can be decoded.

At a time $T_2$ 540, the decoder decodes and displays the first B-picture as specified by a presentation time stamp $PTS_0(2)$ 542. No decoding time stamp (DTS) is present because both the decoding and presenting occur at the same time period. It will be understood that in actual decoders, there can be a relatively small delay between the decoding and the displaying to account for computation time and other latencies. The amount of data that is typically used by a B-picture is relatively small as illustrated by a relatively small decrease 550 in decoder buffer occupancy for the first B-picture. It will be understood, however, that B-pictures can also include intra macroblocks that can consume a relatively large amount of data.

At a time $T_3$ 546, the decoder decodes and displays the second B-picture as specified by a presentation time stamp $PTS_0(3)$ 548.

At the time $T_4$ 538, the decoder displays the first P-picture that was originally decoded at the time $T_1$ 524. At the time $T_4$ 538, the decoder also decodes a second P-picture as specified by the second P-picture's decoding time stamp $DTS_0(4)$ 554. The second P-picture will be presented at a later time, as specified by a presentation time stamp (not shown). The decoder continues to decode and to present other pictures. For example, at a time $T_5$ 544, the decoder may decode and present a B-frame, depending on what is specified by the data stream.

Rate Control and Quantization Control Process

Figure 6A:
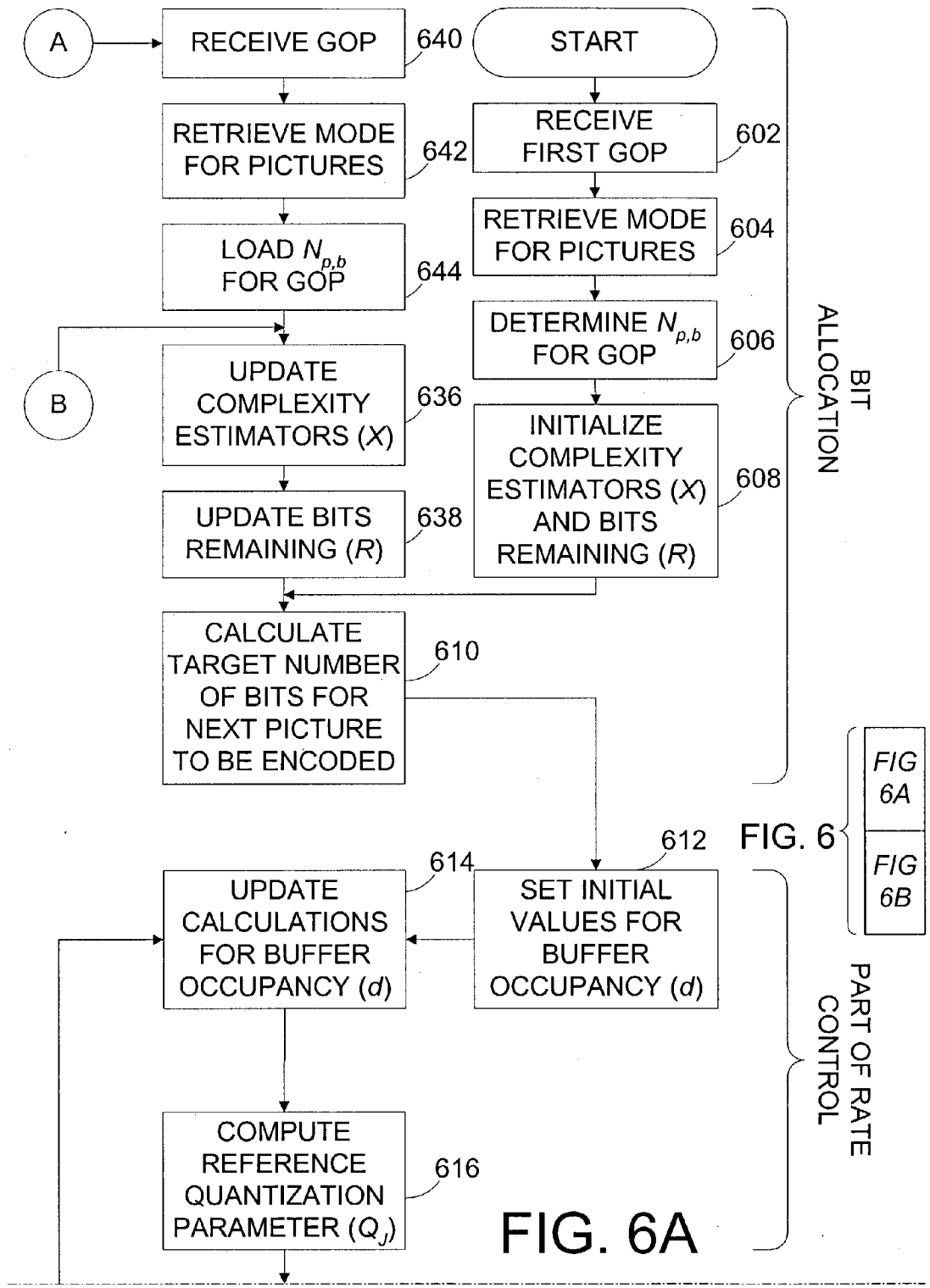
FIG. 6 consists of FIGS. 6A and 6B and is a flowchart that generally illustrates rate control and quantization control in a video encoder.
Figure 6B:
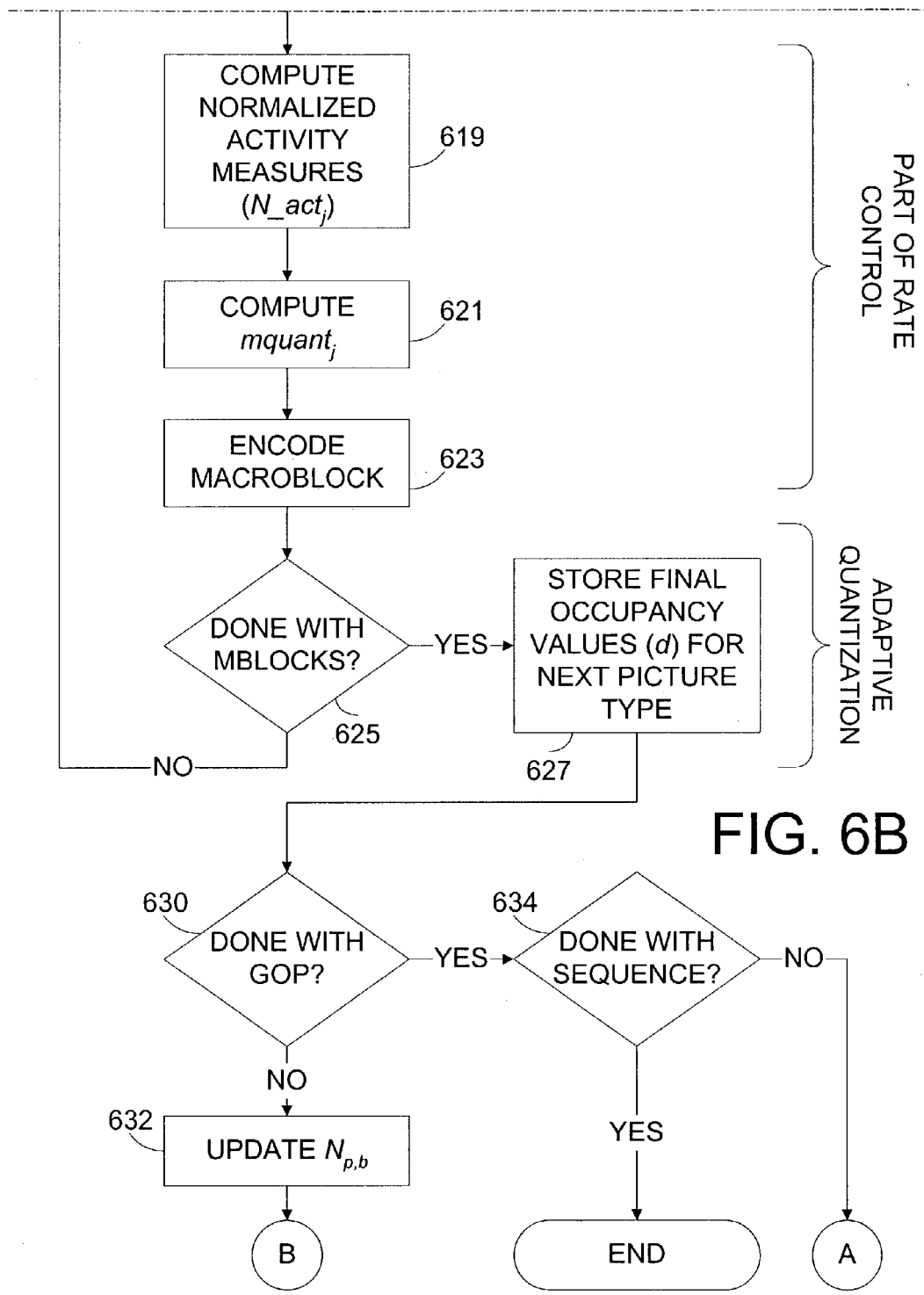

FIG. 6 is a flowchart that generally illustrates a rate control and quantization control process in a video encoder. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. In another embodiment, selected portions of the illustrated process are replaced with processes from a rate control and quantization control process as disclosed in Chapter 10 of Test Model 5. The rate at which bits are consumed to encode pictures affects the occupancy of the decoder buffer during encoding. As illustrated by brackets in FIG. 6, portions of the process are related to bit allocation, to rate control, and to adaptive quantization. Bit allocation relates to estimating the number of bits that should be used to encode the picture to be encoded. Rate control relates to determining the reference quantization parameter $Q_j$ that should be used to encode a macroblock. Adaptive quantization relates to analyzing the spatial activity in the macroblocks in order to modify the reference quantization parameter $Q_j$ and calculate the value of the quantization parameter $mquant_j$ that is used to quantize a macroblock.

The process begins at a state 602, where the process receives its first group of pictures. It will be understood that in one embodiment, the process may retrieve only a portion of the first group of pictures in the state 602 and retrieve remaining portions of the first group of pictures later. In the illustrated process, the pictures are grouped into groups of pictures before the pictures are processed by the rate control and quantization control process. A group of pictures starts with an I-picture and can include other pictures. Typically, but not necessarily, the other pictures in the group of pictures are related to the I-picture. The process advances from the state 602 to a state 604.

In the state 604, the process receives the mode or type of encoding that is to be applied to the pictures in the group of pictures. In the illustrated rate control and quantization control process, the decision as to which mode or type of encoding is to be used for each picture in the group of pictures is made before the pictures are processed by the rate control and quantization control process. For example, the group of pictures described earlier in connection with FIG. 5 have types IPBBP. The process advances from the state 604 to a state 606.

In the state 606, the process determines the number of P-pictures $N_p$ and the number of B-pictures $N_b$ in the group of pictures to be encoded. For example, in the group of pictures with types IPBBP, there are two P-pictures and there are two B-pictures to be encoded such that a value for $N_p$ is 2 and a value for $N_b$ is also 2. There is no need to track the number of I-pictures remaining, as the only I-picture in a group of pictures is the first picture. The process advances from the state 606 to a state 608.

In the state 608, the process initializes values for complexity estimators $X_i$, $X_p$, and $X_b$ and for the remaining number of bits R allocated to the group of pictures that is to be encoded. In one embodiment, the process initializes the values for the complexity estimators $X_i$, $X_p$, and $X_b$ according to Equations 1–3.

$$X_i = \frac{160 \cdot \text{bit\_rate}}{115} \qquad \text{(Eq. 1)}$$

$$X_p = \frac{60 \cdot \text{bit\_rate}}{115} \qquad \text{(Eq. 2)}$$

$$X_b = \frac{42 \cdot \text{bit\_rate}}{115} \qquad \text{(Eq. 3)}$$

In Equations 1–3, the variable bit_rate corresponds to the relatively constant bit rate (in bits per second) of the data channel, such as the constant-bit-rate data channel 410 described earlier in connection with FIG. 4. In another embodiment, bit_rate corresponds to the average or desired average bit rate of a variable bit rate channel. In yet another embodiment, bit_rate corresponds to a piece-wise constant bit rate value of a variable bit rate channel.

In one embodiment, the initial value $R_0$ for the remaining number of bits R at the start of the sequence, i.e., the initial value of R before encoding of the first group of pictures, is expressed in Equation 4 as $R_0$. At the start of the sequence, there is no previous group of pictures and as a result, there is no carryover in the remaining number of bits from a previous group of pictures. Further updates to the value for the remaining number of bits R will be described later in connection with Equations 27 and 28.

$$R_0 = G \qquad \text{(Eq. 4)}$$

$$G = \frac{\text{bit\_rate} \cdot N}{\text{picture\_rate}} \qquad \text{(Eq. 5)}$$

The variable G represents the number of bits that can be transferred by the data channel in an amount of time corresponding to the length of the presentation time for the group of pictures. This amount of time varies with the number of pictures in the group of pictures. In Equation 5, the variable bit_rate is in bits per second, the value of N corresponds to the number of pictures in the group of pictures (of all types), and the variable picture_rate is in pictures or frames per second. The process then advances from the state 608 to a state 610.

In the state 610, the process calculates an initial target number of bits $T_i$, $T_p$, or $T_b$, i.e., an initial target bit allocation, for the picture that is to be encoded. It should be noted that the picture in a group of pictures will typically be encoded out of sequence when B-pictures are encoded. In one embodiment, the rate control and quantization control process calculates the initial target bit allocation for the picture according to the equation from Equations 6–8 for the corresponding picture type that is to be encoded.

$$T_i = \max\left\{\left(\frac{R}{\left(1 + \frac{N_p X_p}{X_i K_p} + \frac{N_b X_b}{X_i K_b}\right)}\right), \left(\frac{\text{bit\_rate}}{8 \cdot \text{picture\_rate}}\right)\right\} \qquad \text{(Eq. 6)}$$

$$T_p = \max\left\{\left(\frac{R}{\left(N_p + \frac{N_b K_p X_b}{K_b X_p}\right)}\right), \left(\frac{\text{bit\_rate}}{8 \cdot \text{picture\_rate}}\right)\right\} \qquad \text{(Eq. 7)}$$

$$T_b = \max\left\{\frac{R}{\left(N_b + \frac{N_p K_b X_p}{K_p X_b}\right)}, \frac{\text{bit\_rate}}{8 \cdot \text{picture\_rate}}\right\} \qquad \text{(Eq. 8)}$$

In Equation 6, $T_i$ corresponds to the target bit allocation for the next picture to be encoded when the picture is the I-picture that starts a group of pictures, and $T_i$ is determined by the higher of the two expressions in the brackets. In Equation 7, $T_p$ corresponds to the target bit allocation for the next picture to be encoded when the next picture is a P-picture. In Equation 8, $T_b$ corresponds to the target bit allocation for the picture when the picture is a B-picture. The values of the "universal constants" $K_p$ and $K_b$ depend on the quantization matrices that are used to encode the pictures. It will be understood that the values for $K_p$ and $K_b$ can vary. In one embodiment, the values for $K_p$ and $K_b$ are 1.0 and 1.4, respectively. In another embodiment, the value of these constants can be changed according to the characteristics of the encoded pictures, such as amount and type of motion, texture, color and image detail.

In one embodiment of the rate control and quantization control process, the process further adjusts the target bit allocation $T_{(i,p,b)}$ from the initial target bit allocation depending on the projected buffer occupancy of the decoder buffer as will be described in greater detail later in connection with FIG. 7.

When the process has determined the target bit allocation for the next picture to be encoded, the process advances from the state 610 to a state 612. Also, the bits allocated to a picture are further allocated among the macroblocks of the picture. This macroblock bit allocation can be calculated by conventional techniques, such as techniques described in TM5, or by the techniques described herein in greater detail later in connection with a state 614. In addition, various orders or sequences in which a picture can advantageously be processed when encoded into macroblocks will be described in greater detail later in connection with FIGS. 8A and 8B.

In the state 612, the process sets initial values for virtual buffer fullness. In one embodiment, there is a virtual buffer for each picture type. The variables $d_j^i$, $d_j^p$, and $d_j^b$ represent the virtual buffer fullness for I-pictures, for P-pictures, and for B-pictures, respectively. The variable j represents the number of the macroblock that is being encoded and starts at a value of 1. A value of 0 for j represents the initial condition. The virtual buffer fullness, i.e., the values of $d_j^i$, $d_j^p$, and $d_j^b$, correspond to the virtual buffer fullness prior to encoding the j-th macroblock such that the virtual buffer fullness corresponds to the fullness at macroblock (j−1).

$$d_0^i = 10 \cdot \frac{r}{31} \qquad \text{(Eq. 9)}$$

$$d_0^p = K_p \cdot d_0^i \qquad \text{(Eq. 10)}$$

$$d_0^b = K_b \cdot d_0^i \qquad \text{(Eq. 11)}$$

One example of a computation for the value of the reaction parameter r that appears in Equation 9 is expressed by Equation 12. It will be understood by one of ordinary skill in the art that other formulas for the calculation of the reaction parameter r can also be used.

$$r = 2 \cdot \frac{\text{bit\_rate}}{\text{picture\_rate}} \qquad \text{(Eq. 12)}$$

With respect to Equations 10 and 11, $K_p$ and $K_b$ correspond to the "universal constants" described earlier in connection with Equations 6–8. The process can advance from the state 612 to the state 614 or can skip to a state 616 as will be described in connection with the state 614.

In the state 614, the process updates the calculations for virtual buffer fullness, i.e., the value for $d_j^i$, $d_j^p$, or $d_j^b$. The value $d_j^i$, $d_j^p$, or $d_j^b$ that is updated depends on the picture type, e.g., the $d_j^i$ value is updated when an I-picture is encoded. The process updates the calculations for the virtual buffer fullness to account for the bits used to encode the macroblock. The update to the virtual buffer fullness should correspond to the technique used to allocate the bits among the macroblocks of a picture. For example, where TM5 is followed, the allocation of bits within the macroblocks of a picture can be approximately linear, i.e., constant. In one embodiment, the bits are also advantageously allocated among macroblocks based on the relative motion of a macroblock within a picture (for P-pictures and B-pictures), rather than an estimate of the relative motion.

Equations 13a, 14a, and 15a generically describe the update to the calculations for virtual buffer fullness.

$$d_j^i = d_0^i + B_{j-1} - TMB_{j-1}^i \qquad \text{(Eq. 13a)}$$

$$d_j^p = d_0^p + B_{j-1} - TMB_{j-1}^p \qquad \text{(Eq. 14a)}$$

$$d_j^b = d_0^b + B_{j-1} - TMB_{j-1}^b \qquad \text{(Eq. 15a)}$$

The variable $B_j$ corresponds to the number of bits that have already been used to encode the macroblocks in the picture that is being encoded, including the bits used in macroblock j such that the variable $B_{j-1}$ corresponds to the number of bits that have been used to encode the macroblocks up to but not including the j-th macroblock. The variables $TMB_{j-1}^i$, $TMB_{j-1}^p$ and $TMB_{j-1}^b$, correspond to the bits allocated to encode the macroblocks up to but not including the j-th macroblock.

Equations 13b, 14b, and 15b express calculations for virtual buffer fullness, i.e., values for $d_j^i$, $d_j^p$, or $d_j^b$, as used in the process described by TM5. Disadvantageously, the TM5 process allocates bits within a picture without regard to motion of macroblocks such that macroblocks that should have bits allocated variably to accommodate rapid motion, such as the macroblocks that encode the movement of an athlete, have the same bits allocated as macroblocks that are relatively easy to encode.

$$d_j^i = d_0^i + B_{j-1} - \left(\frac{T_i \cdot (j-1)}{\text{MB\_cnt}}\right) \qquad \text{(Eq. 13b)}$$

$$d_j^p = d_0^p + B_{j-1} - \left(\frac{T_p \cdot (j-1)}{\text{MB\_cnt}}\right) \qquad \text{(Eq. 14b)}$$

$$d_j^b = d_0^b + B_{j-1} - \left(\frac{T_b \cdot (j-1)}{\text{MB\_cnt}}\right) \qquad \text{(Eq. 15b)}$$

In one embodiment, the updated values are expressed by Equations 13c, 14c, and 15c. The use of Equations 13c, 14c, and 15c permit the allocation of bits to macroblocks within a picture to be advantageously allocated based on the motion activity of a macroblock within a picture. Advantageously, such allocation can permit the bits of a picture to be allocated to macroblocks based on a computation of the relative motion of the macroblock rather than a constant amount or an estimate of the motion. The variable allocation of bits among the macroblocks of a picture will be described in greater detail later in connection with FIGS. 8A and 8B.

$$d_j^i = d_0^i + B_{j-1} - \left(\frac{T_i \cdot \text{Mact\_sum}_{j-1}}{MACT}\right) \qquad \text{(Eq. 13c)}$$

$$d_j^p = d_0^p + B_{j-1} - \left(\frac{T_p \cdot \text{Mact\_sum}_{j-1}}{MACT}\right) \qquad \text{(Eq. 14c)}$$

$$d_j^b = d_0^b + B_{j-1} - \left(\frac{T_b \cdot \text{Mact\_sum}_{j-1}}{MACT}\right) \qquad \text{(Eq. 15c)}$$

The variable MACT represents the sum of the motion activity of all of the macroblocks as expressed in Equation 16. The variable $\text{Mact\_sum}_{j-1}$ corresponds to the sum of the motion activity of all of the macroblocks in the picture that have been encoded, i.e., the macroblocks up to but not including macroblock j, as expressed in Equation 17.

$$MACT = \sum_{k=1}^{\text{MB\_cnt}} Mact_k \qquad \text{(Eq. 16)}$$

$$\text{Mact\_sum}_{j-1} = \sum_{k=1}^{j-1} Mact_k \qquad \text{(Eq. 17)}$$

In Equation 16, the parameter MB_cnt corresponds to the number of macroblocks in the picture and the variable $Mact_k$ corresponds to the motion activity measure of the luminance of the k-th macroblock. A variety of techniques can be used to compute the motion activity measure such as variance computations and sum of absolute difference computations.

In another embodiment, the updated values for the occupancy of the virtual buffers $d_j^i$, $d_j^p$, or $d_j^b$ are calculated based on the corresponding equations for updated virtual buffer occupancy described in Chapter 10 of the TM5 model from MPEG.

In another embodiment, the updated values for the occupancy of the virtual buffers $d_j^i$, $d_j^p$, or $d_j^b$ are calculated based on Equations 13d, 14d, and 15d.

$$d_j^i = d_0^i + B_{j-1} - \left( \alpha_i \frac{T_i \cdot (j-1)}{MB\_cnt} + (1 - \alpha_i) \frac{T_i \cdot Mact\_sum_{j-1}}{MACT} \right) \quad \text{(Eq. 13d)}$$

$$d_j^p = d_0^p + B_{j-1} - \left( \alpha_p \frac{T_p \cdot (j-1)}{MB\_cnt} + (1 - \alpha_p) \frac{T_p \cdot Mact\_sum_{j-1}}{MACT} \right) \quad \text{(Eq. 14d)}$$

$$d_j^b = d_0^b + B_{j-1} - \left( \alpha_b \frac{T_b \cdot (j-1)}{MB\_cnt} + (1 - \alpha_b) \frac{T_b \cdot Mact\_sum_{j-1}}{MACT} \right) \quad \text{(Eq. 15d)}$$

In Equations 13d, 14d, and 15d, $\alpha_i$, $\alpha_p$, and $\alpha_b$ correspond to weighting factors that can range from about 0 to about 1. These weighting factors $\alpha_i$, $\alpha_p$, and $\alpha_b$ permit the allocation of bits to macroblocks within a picture to be advantageously allocated based on a combination of the relatively equal proportioning from TM5 and the proportioning based on motion activity described earlier in connection with Equations 13c, 14c, and 15c. This combined allocation can advantageously compensate for bits that are relatively evenly allocated, such as bits for overhead. The values for the weighting factors $\alpha_i$, $\alpha_p$, and $\alpha_b$ can vary widely within the range of about 0 to about 1. In one embodiment, the weighting factors $\alpha_i$, $\alpha_p$, and $\alpha_b$ range from about 0 to about 0.5. For example, sample values for these weighting factors can correspond values such as 0.2, 0.3, 0.4 and 0.5. Other values within the range of about 0 to about 1 will be readily determined by one of ordinary skill in the art. One embodiment of the video encoder permits a user to configure the values for the weighting factors $\alpha_i$, $\alpha_p$, and $\alpha_b$.

The values for the occupancy of the virtual buffers $d_j^i$, $d_j^p$, or $d_j^b$ are computed for each macroblock in the picture. It will be understood, however, that the value for the first macroblock, i.e., $d_1^i$, $d_1^p$, or $d_1^b$, is the same as the initial values set in the state 612 such that the state 614 can be skipped for the first macroblock. The process advances from the state 614 to the state 616.

In the state 616, the process computes the reference quantization parameter $Q_j$ that is to be used to quantize macroblock j. Equation 18 expresses a computation for the reference quantization parameter $Q_j$. The process advances from the state 616 to a state 619.

$$Q_j = \left( \frac{d_j \cdot 31}{r} \right) \quad \text{(Eq. 18)}$$

In the state 619, the process computes the normalized spatial activity measures $N\_Sact_j$ for the macroblocks. In one embodiment, the process computes the normalized spatial activity measures $N\_Sact_j$ in accordance with the TM5 process and Equations 19a, 19b, 21a, 22, and 23a. Disadvantageously, the computation of the normalized spatial activity measures $N\_Sact_j$ via TM5 allocates bits to macroblocks within a picture based only on spatial activity (texture) and does not take motion into consideration. In addition, as will be explained in greater detail later in connection with Equation 23a, the TM5 process disadvantageously uses an inappropriate value in the computation of an average of the spatial activity measures $Savg\_act_j$ due to limitations in the processing sequence, which is explained in greater detail later in connection with FIGS. 8A and 8B.

In another embodiment, the process computes the normalized spatial activity measures $N\_Sact_j$ in accordance with Equations 20a, 21b, 21c, 22, and 23b. The combination of the motion activity measure used for computation of the reference quantization parameter $Q_j$ with the modulation effect achieved through the normalized spatial activity measure advantageously permits bits to be allocated within a picture to macroblocks not only based on spatial activity (texture), but also based on motion. This can dramatically improve a picture. For example, when only spatial activity is used, areas of a picture with rapid motion, such as an area corresponding to an athlete's legs in a sporting event, are typically allocated relatively few bits, which results in visual artifacts such as a "blocky" appearance. This happens because areas of pictures with rapid motion typically exhibit relatively high spatial activity (high texture), and are then allocated relatively few bits. In addition, as will be described later in connection with Equation 23b, one embodiment further uses the actual values for spatial activity measures, which advantageously results in a better match between targeted bits and actually encoded bits, thereby decreasing the likelihood of buffer overrun or buffer underrun.

In the state 619, the activity corresponds to spatial activity within the picture to determine the texture of the picture. A variety of techniques can be used to compute the spatial activity. For example, the process can compute the spatial activity in accordance with the techniques disclosed in Chapter 10 of Test Model 5 or in accordance with new techniques that are described herein. Equation 19a illustrates a computation for the spatial activity of a macroblock j from luminance frame-organized sub-blocks and field-organized sub-blocks as set forth in Chapter 10 of Test Model 5. The intra picture spatial activity of the j-th macroblock, i.e., the texture, can be computed using Equation 19b, which corresponds to the computation that is used in TM5.

$$act_j = 1 + \min(vblk_1, vblk_2, \ldots, vblk_8) \quad \text{(Eq. 19a)}$$

$$vblk_n = \frac{1}{64} \cdot \sum_{k=1}^{64} (P_k^n - P\_mean_n)^2 \quad \text{(Eq. 19b)}$$

A formula for computing the value of $P\_mean_n$ is expressed later in Equation 21a. The values for $P_k^n$ correspond to the sample values from pixels in the n-th original 8 by 8 sub-block. Disadvantageously, the computation expressed in Equation 19b is relatively complicated and CPU intensive to compute, which can make real-time encoding difficult with relatively slow general purpose CPUs, such as microprocessors. Equation 19b computes the spatial activity via computation of a variance, which is referred to as L2-norm. This can be a drawback when video encoding is performed in real time and with full resolution and picture rates. As a result, real time video encoding is typically performed in conventional systems with dedicated hardware. Although dedicated hardware video encoders can process video at relatively high speeds, dedicated hardware is relatively more expensive, less supportable, and harder to upgrade than a software solution that can be executed by a general-purpose electronic device, such as a personal computer. Thus, video encoding techniques that can efficiently process video can advantageously permit a general-purpose electronic device to encode video in real time.

Equation 20a illustrates a computation for the spatial activity of macroblock j according to one embodiment. Another embodiment uses sums of absolute differences (instead of sum of squares of differences) as illustrated in Equations 19a and 19b to compute the spatial activity of macroblock j. Equation 20b illustrates a computation for the motion activity of macroblock j according to one embodiment.

$$Sact_j = \sum_{k=1}^{256} |P_k^j - \text{P\_mean}_j| \quad \text{(Eq. 20a)}$$

$$Mact_j = \sum_{k=1}^{256} |P_k^j - \text{P\_mean}_j| \quad \text{(Eq. 20b)}$$

In Equation 20a, the $P_k^j$ values correspond to original luminance data. In Equation 20b, the $P_k^j$ values correspond to either original luminance data or to motion-compensated luminance data depending on the type of macroblock. The $P_k^j$ values correspond to sample values for the j-th 16 by 16 original luminance data when the macroblock is an intra macroblock. When the macroblock is an inter macroblock, the $P_k^j$ values correspond to 16 by 16 motion compensated luminance data. A formula for computing the value of P_mean$_j$ is expressed later in Equation 21b and 21c.

Moreover, the computations expressed in Equations 20a and 20b can advantageously permit a general-purpose electronic device to perform full picture rate and relatively high resolution video encoding using the described rate control and quantization control process in real time using software. It will be understood that the computations expressed in Equations 20a and 20b can also be used in non-real time applications and in dedicated hardware. One embodiment of a video encoding process, which was implemented in software and executed by an Intel® Pentium® 4 processor with a 3 GHz clock speed, efficiently and advantageously encoded a PAL, a SECAM, or an NTSC video data stream with a full picture rate and with full resolution (720×480 pixels) in real time.

The computations expressed in Equations 20a and 20b compute the sum of absolute differences (SAD), which is also known as an L1-norm calculation. Although the computation of the SAD can also be relatively complex, selected processors or CPUs include a specific instruction that permits the computation of the SAD in a relatively efficient manner. In one embodiment, the general-purpose electronic device corresponds to a personal computer with a CPU that is compatible with the Streaming Single Instruction/Multiple Data (SIMD) Extensions (SSE) instruction set from Intel Corporation. In another embodiment, the CPU of the general-purpose electronic device is compatible with an instruction that is the same as or is similar to the "PSADBW" instruction for packed sum of absolute differences (PSAD) of the SSE instruction set. Examples of CPUs that are compatible with some or all of the SSE instruction set include the Intel® Pentium® III processor, the Intel® Pentium® 4 processor, the Intel® Xeon™ processor, the Intel® Centrino™ processor, selected versions of the Intel® Celeron® processor, selected versions of the AMD Athlon™ processor, selected versions of the AMD Duron™ processor, and the AMD Opteron™ processor. It will be understood that future CPUs that are currently in development or have yet to be developed can also be compatible with the SSE instruction set. It will also be understood that new instruction sets can be included in new processors and these new instruction sets can remain compatible with the SSE instruction set.

Equation 21a expresses a calculation for sample values as used in Equation 19b. Equations 21b and 21c express calculations for sample values as used in Equations 20a and 20b.

$$\text{P\_mean}_n = \frac{1}{64} \cdot \sum_{k=1}^{64} P_k^n \quad \text{(Eq. 21a)}$$

$$\text{P\_mean}_j = \frac{1}{256} \cdot \sum_{k=1}^{256} P_k^j \quad \text{(Eq. 21b)}$$

$$\text{P\_mean}_j = 0 \quad \text{(Eq. 21c)}$$

In one embodiment, the process performs a computation for the average of the sample values in the n-th original 8 by 8 sub-block P_mean$_n$ according to TM5 as expressed by Equation 21a. In another embodiment, the process computes the computation for the average of sample values P_mean$_j$ via Equations 21b and 21c. Advantageously, Equations 21b and 21c combine spatial activity (texture) computations and motion estimation computations. Equation 21b is used when the macroblock corresponds to an intra macroblock. Equation 21c is used when the macroblock corresponds to an inter macroblock.

Equation 22 expresses a computation for the normalized spatial activity measures N_Sact$_j$. The normalized spatial activity measures N_Sact$_j$ are used in a state 621 to compute the quantization that is applied to the discrete cosine transform (DCT) coefficients.

$$\text{N\_Sact}_j = \frac{(2 \cdot Sact_j) + \text{Savg\_act}}{Sact_j + (2 \cdot \text{Savg\_act})} \quad \text{(Eq. 22)}$$

As expressed in Equation 22, the normalized spatial activity measures N_Sact$_j$ for the j-th macroblock are computed from the spatial activity measure Sact$_j$ for the macroblock and from an average of the spatial activity measures Savg_act. The average of the spatial activity measures Savg_act can be computed by Equation 23a or by Equation 23b.

$$\text{Savg\_act} = \frac{1}{\text{MB\_cnt}} \cdot \sum_{j=1}^{\text{MB\_cnt}} Sact_j^{previous} \quad \text{(Eq. 23a)}$$

The computation expressed in Equation 23a represents the computation described in TM5 and uses the spatial activity measures $Sact_j$ from the previous picture and not from the present picture. As a result, conventional encoders that comply with TM5 compute the normalized spatial activity measures $N\_Sact_j$ expressed in Equation 22 relatively inaccurately. When a value for the average of the spatial activity measures $Savg\_act_j$ is calculated via Equation 23a, the normalized spatial activity measures $N\_Sact_j$ represents an estimate for normalization, rather than an actual calculation for normalization. The estimate provided in Equation 23a is particularly poor when the scene has changed from the previous picture to the current picture. As taught in TM5, a value of 400 can be used to initialize the average of the spatial activity measures $Savg\_act_j$ for the first picture when the average of the spatial activity measures $Savg\_act_j$ is computed from the previous picture.

Encoding via the process described in TM5 uses the previous picture for the average of the spatial activity measures $Savg\_act_j$ because the processing sequence described in TM5 processes macroblocks one-by-one as the TM5 process encodes each macroblock, such that a value for the average of the spatial activity measures $Savg\_act_j$ is not available at the time of the computation and use of the value for the normalized spatial activity measures $N\_Sact_j$. Further details of an alternate processing sequence will be described in greater detail later in connection with FIGS. 8A and 8B. The computation expressed in Equation 23b represents an improvement over the TM5-based computation expressed in Equation 23a.

$$Savg\_act = \frac{1}{MB\_cnt} \cdot \sum_{j=1}^{MB\_cnt} Sact_j^{current} \qquad (\text{Eq. 23b})$$

In one embodiment, the sequence of processing of macroblocks is advantageously rearranged as will be described later in connection with FIGS. 8A and 8B. This rearrangement permits the average of the spatial activity measures $Savg\_act_j$ to be computed from the spatial activity measures $Sact_j$ of the macroblocks in the current picture such that the value for the normalized spatial activity measures $N\_Sact_j$ is actually normalized rather than estimated. This advantageously permits the data to be relatively predictably quantized such that the amount of data used to encode a picture more accurately follows the targeted amount of data. This further advantageously reduces and/or eliminates irregularities and distortions to the values for the variables $d_j^i$, $d_j^p$, and $d_j^b$ that represent the virtual buffer fullness for I-pictures, for P-pictures, and for B-pictures, respectively. In addition, it should be noted that the computation for the average of the spatial activity measures $Savg\_act_j$ expressed in Equation 23b does not need to be initialized with an arbitrary value, such as a value of 400, because the actual average is advantageously computed from the spatial activity measures $Sact_j$ of the picture that is currently being encoded. The process advances from the state 619 to the state 621. Advantageously, this permits calculation of actual motion activity measures, needed for the calculation of virtual buffer fullness status, as shown in Equations 13–17.

In the state 621, the process computes the quantization parameter $mquant_j$. The quantization parameter $mquant_j$ is used to quantize the encoded macroblock j. It will be understood that the quantization parameter $mquant_j$ can be used in the state 621 or can be stored and used later. Equation 23 expresses a computation for the quantization parameter $mquant_j$.

$$mquant_j = Q_j \cdot N\_Sact_j \qquad (\text{Eq. 23})$$

In Equation 23, $Q_j$ corresponds to the reference quantization parameter described earlier in connection with Equation 18 and $N\_act_j$ corresponds to the normalized spatial activity measures $N\_Sact_j$ described earlier in connection with Equation 22. In one embodiment, the process further inspects the computed quantization parameter $mquant_j$ and limits its value to prevent undesirable clipping of a resulting quantized level QAC(i,j). For example, where one embodiment of the process is used to encode video according to the MPEG-1 standard, the process detects that the calculated value for the quantization parameter $mquant_j$ corresponds to 2, and automatically substitutes a value of 4. The quantization parameter $mquant_j$ is later used in the macroblock encoding process to generate values for the quantized level QAC(i,j). However, in MPEG-1, a value for the quantized level QAC(i,j) is clipped to the range between −255 and 255 to fit within 8 bits. This clipping of data can result in visible artifacts, which can advantageously be avoided by limiting the value of a quantization parameter $mquant_j$ to a value that prevents the clipping of the resulting quantized level, thereby advantageously improving picture quality.

In one embodiment, the process can further reset values for occupancy of virtual buffers ($d_j^i$, $d_j^p$, and $d_j^b$ and for the quantization parameter $mquant_j$ in response to selected stimuli as will be described in greater detail later in connection with FIG. 9A. The process advances from the state 621 to a state 623.

In the state 623, the process encodes the j-th macroblock. The process encodes the j-th macroblock using the quantization parameter $mquant_j$ computed earlier in the state 616. The encoding techniques can include, for example, the computation of discrete cosine transforms, motion vectors, and the like. In one embodiment, the process can selectively skip the encoding of macroblocks in B-pictures as will be described in greater detail later in connection with FIG. 11. The process advances from advances from the state 623 to a decision block 625.

In the decision block 625, the process determines whether all the macroblocks in the picture have been processed by encoding in the state 616 or by skipping as will be described in connection with FIG. 11. The process proceeds from the decision block 625 to a state 627 when the process has completed the encoding or skipping processing of the macroblocks in the picture. Otherwise, the process returns from the decision block 625 to the state 614 to continue to process the next macroblock.

In the state 627, the process stores the final occupancy value of the virtual buffers as an initial condition for encoding of the next picture of the same type. For example, the final occupancy value for the relevant virtual buffer of the present frame, i.e., the value for $d_j^i$, $d_j^p$, or $d_j^b$, when j is equal to MB_cnt, is saved so that it can be used as a starting value for $d_0^i$, $d_0^p$, or $d_0^b$, respectively, for the next picture of the same type. In some circumstances, the number of bits used for encoding can be relatively low for a sustained period of time so that bit or byte stuffing is used to increase the number of bits used in encoding. This prevents a buffer overrun condition in the decoder buffer. However, the use of bit stuffing can undesirably distort the occupancy value in the corresponding virtual buffer, which can then result in instability in the encoder. In one embodiment, the rate control and quantization control process includes one or more techniques that advantageously ameliorate against the effects of bit stuffing. Examples of such techniques will be described in greater detail later in connection with FIGS. 9A and 9B. The process advances from the state 627 to a decision block 630. In the decision block 630, the illustrated process has completed the processing for the picture and determines whether the picture that was processed corresponds to the last picture in the group of pictures (GOP). This can be accomplished by monitoring the values remaining in the number of P-pictures $N_p$ and the number of B-pictures $N_b$ described earlier in connection with the state 606. The process proceeds from the decision block 630 to a state 632 when there are pictures that remain to be processed in the group of pictures. Otherwise, i.e., when the process has completed processing of the group of pictures, the process proceeds from the decision block 630 to a decision block 634.

In the state 632, the process updates the appropriate value in the number of P-pictures $N_p$ or the number of B-pictures $N_b$ and advances to a state 636 to initiate the processing of the next picture in the group of pictures. It will be understood that the next picture to be processed may not be the next picture to be displayed because of possible reordering of pictures during encoding.

In the state 636, the process updates the corresponding complexity estimators $X_i$, $X_p$, and $X_b$ based on the picture that just been encoded. For example, if an I-picture had just been encoded, the process updates the complexity estimator $X_i$ for the I-pictures as expressed in Equation 24. If the picture that had just been encoded was a P-picture or was a B-picture, the process updates the corresponding complexity estimator $X_p$ or $X_b$, respectively, as expressed in Equation 25 and in Equation 26.

$$X_i = S_i Q_i \quad \text{(Eq. 24)}$$

$$X_p = S_p Q_p \quad \text{(Eq. 25)}$$

$$X_b = S_b Q_b \quad \text{(Eq. 26)}$$

In Equations 24, 25, and 26, the value of $S_i$, $S_p$, or $S_b$ corresponds to the number of bits generated or used to encode the picture for a picture of type I-picture, P-picture, or B-picture, respectively. The value of $Q_i$, $Q_p$, and $Q_b$ corresponds to the average of the values for the quantization parameter mquant$_j$ that were used to quantize the macroblocks in the picture. The process advances from the state 636 to a state 638.

In the state 638, the process updates the remaining number of bits R allocated to the group of pictures. The update to the remaining number of bits R allocated to the group of pictures depends on whether the next picture to be encoded is a picture from the existing group of pictures or whether the next picture to be encoded is the first picture in a new group of pictures. Both Equations 27 and 28 are used when the next picture to be processed is the first picture in a new group of pictures. When the next picture to be processed is another picture in the same group of pictures as the previously processed picture, then only Equation 27 is used. It will be understood that Equations 27 and 28 represent assignment statements for the value of R, such that a new value for R is represented to the left of the "=" sign and a previous value for R is represented to the right of the "=" sign.

$$R = R - S_{(i,p,b)} \quad \text{(Eq. 27)}$$

$$R = G + R \quad \text{(Eq. 28)}$$

In Equation 27, the process computes the new value for the remaining number of bits R allocated to the group of pictures by taking the previous value for R and subtracting the number of bits $S_{(i,p,b)}$ that had been used to encode the picture that had just been encoded. The number of bits $S_{(i,p,b)}$ that had been used to encode the picture is also used to calculate the VBV buffer model occupancy as will be described in greater detail later in connection with FIG. 7. The computation expressed in Equation 27 is performed for each picture after it has been encoded. When the picture that has just been encoded is the last picture in a group of pictures such that the next picture to be encoded is the first picture in a new group of pictures, the computation expressed in Equation 27 is further nested with the computation expressed in Equation 28. In Equation 28, the process adds to a remaining amount in R, which can be positive or negative, a value of G. The variable G was described earlier in connection with Equation 5. The value of G is based on the new group of pictures to be encoded and corresponds to the number of bits that can be transferred by the data channel in the amount of time corresponding to the length of the presentation time for the new group of pictures. The process returns from the state 638 to the state 610 to continue to the video encoding process as described earlier.

Returning now to the decision block 634, at this point in the process, the process has completed the encoding of a picture that was the last picture in a group of pictures. In the decision block 634, the process determines whether it has completed with the encoding of the video sequence. It will be understood that the process can be used to encode video of practically indefinite duration, such as broadcast video, and can continue to encode video endlessly. The process proceeds from the decision block 634 to a state 640 when there is another group of pictures to be processed. Otherwise, the process ends.

In the state 640, the process receives the next group of pictures. It will be understood that in another embodiment, the process may retrieve only a portion of the next group of pictures in the state 640 and retrieve remaining portions later. In one embodiment, the state 640 is relatively similar to the state 602. The process advances from the state 640 to a state 642.

In the state 642, the process receives the mode or type of encoding that is to be applied to the pictures in the group of pictures. In the illustrated rate control and quantization control process, the decision as to which mode or type of encoding is to be used for each picture in the group of pictures is made before the pictures are processed by the rate control and quantization control process. In one embodiment, the state 642 is relatively similar to the state 604. The process advances from the state 642 to a state 644.

In the state 644, the process determines the number of P-pictures $N_p$ and the number of B-pictures $N_b$ in the next group of pictures to be encoded. In one embodiment, the state 644 is relatively similar to the state 606. The process advances from the state 644 to the state 636, which was described in greater detail earlier, to continue with the encoding process.

Control with VBV Buffer Model Occupancy Levels

Figure 7:
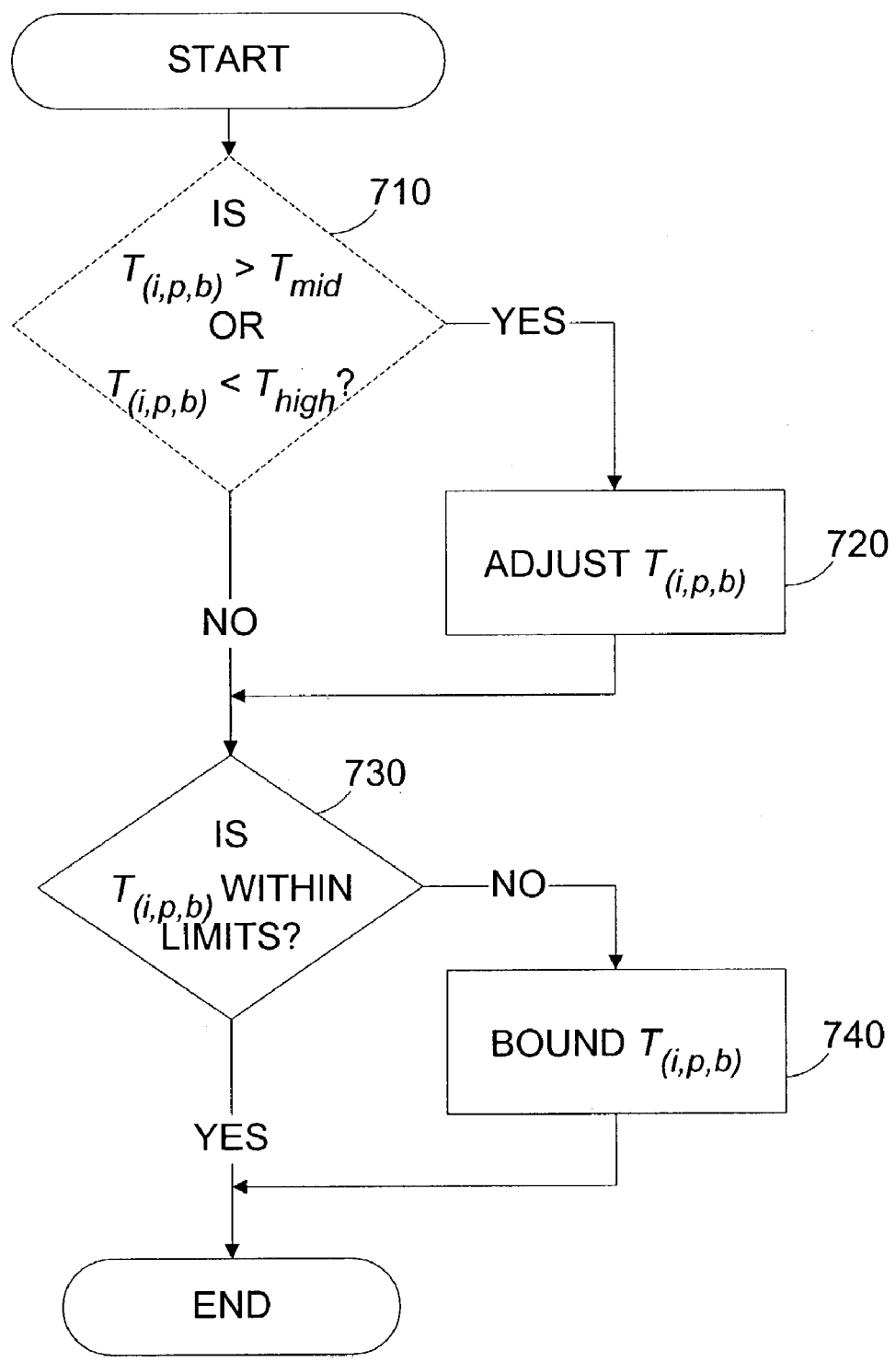
FIG. 7 is a flowchart that generally illustrates a process for adjusting a targeted bit allocation based at least in part on an occupancy level of a virtual buffer.

FIG. 7 is a flowchart that generally illustrates a process for adjusting a targeted bit allocation based on an occupancy level of a virtual buffer. To illustrate the operation of the process, the process will be described in connection with MPEG-1 and MPEG-2 video encoding so that the virtual buffer corresponds to the video buffer verifier (VBV) buffer model. The VBV buffer model is a conceptual model that is used by the encoder to model the buffer occupancy levels in a decoder. It will be apparent to one of ordinary skill in the art that other buffer models can be used with other video encoding standards. Monitoring of VBV buffer model levels will be described now in greater detail before further discussion of FIG. 7.

As described earlier in connection with FIG. 4, the VBV buffer model anticipates or predicts buffer levels in the decoder buffer. The occupancy level of the decoder buffer is approximately inverse to the occupancy level of the encoder buffer, such that a relatively high occupancy level in the VBV buffer model indicates that relatively few bits are being used to encode the video sequence, and a relatively low occupancy level in the VBV buffer model indicates that relatively many bits are being used to encode the video sequence.

The occupancy level $V_{status}$ of the VBV buffer model is computed and monitored. In one embodiment, the occupancy level $V_{status}$ of the VBV buffer model is compared to a predetermined threshold, and the encoding can be adapted in response to the comparison as will be described in greater detail later in connection with FIG. 11. In another embodiment, the occupancy level $V_{status}$ of the VBV buffer model is used to adaptively adjust a target number of bits $T_i$, $T_p$, or $T_b$ for a picture to be encoded. A computation for the occupancy level $V_{status}$ is expressed in Equation 29.

$$V_{status} = V_{status} - S_{(i,p,b)} + \frac{bit\_rate}{picture\_rate} \quad \text{(Eq. 29)}$$

Equation 29 represents an assignment statement for the value of the occupancy level $V_{status}$. A new value for the occupancy level $V_{status}$ is represented at the left of the "=" sign, and a previous value for the occupancy level $V_{status}$ is represented to the right of the "=" sign. In one embodiment, the value of the occupancy level $V_{status}$ is initialized to a target value for the VBV buffer model. An example of a target value is ⅞'s of the full capacity of the VBV buffer model. In another embodiment, the value of $V_{status}$ is initialized to a buffer occupancy that corresponds to a specified VBV-delay value. Other initialization values can be readily determined by one of ordinary skill in the art.

In Equation 29, the occupancy of the VBV buffer model is computed as follows. The number of bits $S_{(i,p,b)}$ that had been used to encode the picture just encoded is subtracted from the previous value for the occupancy level $V_{status}$, and the number of bits that would be transmitted in the time period corresponding to a "frame" or picture is added to the value for the occupancy level $V_{status}$. As illustrated in Equation 29, the number of bits that would be transmitted in the frame is equal to bit rate times the inverse of the frame rate. The computation expressed in Equation 29 is adapted to update the occupancy level $V_{status}$ for each picture processed. In another embodiment, the expression is modified to update the occupancy level $V_{status}$ for less than each picture, such as every other picture.

As will be described later in connection with FIG. 7, one embodiment of the process compares the target number of bits for a picture $T_i$, $T_p$, or $T_b$ to a threshold $T_{mid}$, and adjusts the target number of bits $T_i$, $T_p$, or $T_b$ in response to the comparison. This advantageously assists the video encoder to produce a data stream that is compliant with VBV to protect against buffer underrun or buffer overrun in the decoder.

One embodiment uses five parameters related to VBV buffer model occupancy levels for control. It will be understood that in other embodiments, fewer than five parameters or more than five parameters can also be used. The parameters can vary in a very broad range and can include fixed parameters, variable parameters, adaptable parameters, user-customizable parameters, and the like. In one embodiment, the following parameters are used (in decreasing order of occupancy): $V_{high}$, $V_{target}$, $V_{mid}$, $V_{low}$, and $V_{critical}$.

$V_{high}$ corresponds to a relatively high value for the occupancy of the VBV buffer model. In one embodiment, the process strives to control encoding such that the occupancy of the VBV buffer model is maintained below $V_{high}$.

$V_{target}$ corresponds to an occupancy level for the VBV buffer model that is desired. In one embodiment, the desired buffer occupancy level $V_{target}$ can be configured by a user.

$V_{mid}$ corresponds to an occupancy level that is about half of the capacity of the VBV buffer model.

$V_{low}$ corresponds to a relatively low value for the occupancy of the VBV buffer model. In one embodiment, the process strives to control encoding such that the occupancy of the VBV buffer model is maintained above $V_{low}$.

$V_{critical}$ corresponds to an even lower occupancy level than $V_{low}$. In one embodiment, when the occupancy of the VBV buffer model falls below $V_{critical}$, the process proceeds to skip macroblocks in B-pictures as will be described in greater detail later in connection with FIG. 11.

Table II illustrates sample values for threshold levels. Other suitable values will be readily determined by one of ordinary skill in the art.

TABLE II

| Threshold | Sample Value |
| --- | --- |
| $V_{high}$ | about 63/64 of VBV buffer model size |
| $V_{target}$ | about ⅞ of VBV buffer model size |
| $V_{mid}$ | about ½ of VBV buffer model size |
| $V_{low}$ | about ⅜ of VBV buffer model size |
| $V_{critical}$ | about ¼ of VBV buffer model size |

The sample values listed in Table II are advantageously scaled to the VBV buffer model size. As described in greater detail earlier in connection with FIG. 4, the VBV buffer model size is approximately 224 kB for MPEG-2 and is approximately 40 kB for MPEG-1. It will be understood by one of ordinary skill in the art that the size of a virtual buffer model, such as the VBV buffer model for MPEG-1 and MPEG-2, can vary according with the video encoding standard used and the application scenario.

Returning now to FIG. 7, the process illustrated in FIG. 7 adjusts a targeted bit allocation $T_i$, $T_p$, or $T_b$ for a picture based at least in part on the occupancy level $V_{status}$ of the VBV buffer model. In one embodiment, the process illustrated in FIG. 7 is incorporated in the state 610 of the process illustrated in FIG. 6. The process can start at an optional decision block 710, where the process compares the value of the targeted bit allocation $T_i$, $T_p$, or $T_b$ (generically written as $T_{(i,p,b)}$ in FIG. 7) to one or more target thresholds, such as to $T_{mid}$ or to $T_{high}$. For example, the target threshold $T_{mid}$ can be selected such that the adjustment process is invoked when the VBV buffer model occupancy level is relatively low. In another example, the target threshold $T_{high}$ can be selected such that the adjustment process is invoked when the VBV buffer model occupancy is relatively high. In one embodiment, only one of the target thresholds $T_{mid}$ or $T_{high}$ is used, in another embodiment, both target thresholds are used, and in yet another embodiment, the optional decision block 710 is not present and neither target threshold is used. In the illustrated embodiment, the adjustment process is invoked in response to the VBV buffer model occupancy level and to the number of bits allocated to the picture to be encoded. The computation of the targeted bit allocation $T_i$, $T_p$, or $T_b$ can be performed as described earlier in connection with the state 610 and Equations 6, 7, and 8 of FIG. 6. Equation 30a expresses a sample computation for the target threshold $T_{mid}$. Equation 30b expresses a sample computation for the target threshold $T_{high}$.

$$T_{mid} = V_{status} - V_{mid} \qquad \text{(Eq. 30a)}$$

$$T_{high} = V_{status} - V_{high} + \frac{\text{bit\_rate}}{\text{picture\_rate}} \qquad \text{(Eq. 30b)}$$

The illustrated embodiment of the process proceeds from the optional decision block 710 to a state 720 when the targeted bit allocation $T_i$, $T_p$, or $T_b$ exceeds the target threshold $T_{mid}$ or when the targeted bit allocation $T_i$, $T_p$, or $T_b$ is less than the target threshold $T_{high}$. It will be understood that in another embodiment or configuration, where the optional decision block 710 is not present, the process can start at the state 720. When the targeted bit allocation $T_i$, $T_p$, or $T_b$ exceeds the target threshold $T_{mid}$, the VBV buffer model occupancy is relatively low. In the illustrated embodiment, the target threshold $T_{mid}$, is selected such that the adjustment to the targeted bit allocation occurs when a picture is allocated enough bits such that, without adjustment, the VBV buffer model occupancy would fall or would stay below $V_{mid}$. Other thresholds will be readily determined by one of ordinary skill in the art.

When the targeted bit allocation $T_i$, $T_p$, or $T_b$ does not exceed the target threshold $T_{mid}$ and the targeted bit allocation $T_i$, $T_p$, or $T_b$ is not less than the target threshold $T_{high}$, the illustrated process proceeds from the optional decision block 710 to a decision block 730. It will be understood that where the optional decision block 710 is not present or is not used, the process can begin at the state 720, which then proceeds to the decision block 730. In another embodiment, when the targeted bit allocation $T_i$, $T_p$, or $T_b$ does not exceed the target threshold $T_{mid}$ and the targeted bit allocation $T_i$, $T_p$, or $T_b$ is not less than the target threshold $T_{high}$, the process proceeds to end from the optional decision block 710, such as, for example, by proceeding to the state 612 of the process described in connection with FIG. 6. In the illustrated optional decision block 710, the comparison uses the same target thresholds $T_{mid}$ and/or $T_{high}$ for I-pictures, for P-pictures, and for B-pictures. In another embodiment, the target thresholds $T_{mid}$ and/or $T_{high}$ varies depending on the picture type.

In the state 720, which is entered when the targeted bit allocation $T_i$, $T_p$, or $T_b$ exceeds the target threshold $T_{mid}$, or when the targeted bit allocation $T_i$, $T_p$, or $T_b$ is less than the target threshold $T_{high}$, the process adjusts the value of the targeted bit allocation $T_i$, $T_p$, or $T_b$ to reduce the number of bits allocated to the picture. In another embodiment, the process starts at the state 720. For example, one embodiment of the process is configurable by a user such that the process does not have the optional decision block 710 and instead, starts at the state 720. For example, the adjustment to the $T_i$, $T_p$, or $T_b$ can be configured to decrease the number of bits. Advantageously, when fewer bits are used to encode a picture, the VBV buffer model occupancy level, and correspondingly, a decoder's buffer occupancy level, can increase. Equation 31 illustrates a general formula for the adjustment.

$$T_{(i,p,b)} = \alpha \cdot T_{(i,p,b)} \qquad \text{(Eq. 31)}$$

In Equation 31, the adjustment factor $\alpha$ can be less than unity such that the targeted bit allocation $T_i$, $T_p$, or $T_b$ after adjustment is smaller than originally calculated. In one embodiment, the adjustment factor $\alpha$ can also correspond to values greater than unity such that the targeted bit allocation $T_i$, $T_p$, or $T_b$ after adjustment is larger than originally calculated. For clarity, the adjustment of Equation 31 illustrates an adjustment to a separately calculated targeted bit allocation $T_i$, $T_p$, or $T_b$. However, it will be understood that the adjustment can also be incorporated in the initial calculation of the targeted bit allocation $T_i$, $T_p$, or $T_b$. It will be understood that Equation 31 corresponds to an assignment statement such that the value to the right of the "=" corresponds to the targeted bit allocation $T_i$, $T_p$, or $T_b$ before adjustment, and the value to the left of the "=" corresponds to the targeted bit allocation $T_i$, $T_p$, or $T_b$ after adjustment. Equation 32 expresses a sample computation for the adjustment factor $\alpha$.

$$\alpha = 1 + \frac{V_{status} - V_{target}}{V_{high} - V_{low}} \qquad \text{(Eq. 32)}$$

As illustrated in Equation 32, the adjustment factor $\alpha$ is less than unity when $V_{status}$ is less than $V_{target}$, and the adjustment factor $\alpha$ is greater than unity when $V_{status}$ is greater than $V_{target}$. A net effect of the adjustment expressed in Equation 31 is to trend the occupancy level of the VBV buffer model to the desired occupancy level $V_{target}$.

It should be noted that when the targeted bit allocation $T_i$, $T_p$, or $T_b$ exceeds the target threshold $T_{mid}$ in the optional decision block 710, the value for the VBV buffer model occupancy $V_{status}$ will typically be less than the value for the desired VBV occupancy level $V_{target}$ such that adjustment factor $\alpha$ is less than unity. Advantageously, the targeted bit allocation can be reduced by an amount related to how much below the VBV buffer model occupancy $V_{status}$ is from the desired VBV occupancy level $V_{target}$. When the targeted bit allocation $T_i$, $T_p$, or $T_b$ is less than the target threshold $T_{high}$, the value for the VBV buffer model occupancy $V_{status}$ will typically be higher than the value for the desired VBV occupancy level $V_{target}$ such that adjustment factor $\alpha$ is greater than unity. Advantageously, the targeted bit allocation can be increased by an amount related to how much above the VBV buffer model occupancy $V_{status}$ is from the desired VBV occupancy level $V_{target}$. The process advances from the state 720 to the decision block 730.

In the decision block 730, the process determines whether the targeted bit allocation $T_i$, $T_p$, or $T_b$, with or without adjustment by the state 720, falls within specified limits. These limits can advantageously be used to prevent a value for the targeted bit allocation $T_i$, $T_p$, or $T_b$ from resulting in buffer underrun or buffer overrun. These limits can be predetermined or can advantageously be adapted to the targeted bit allocation $T_i$, $T_p$, or $T_b$ and the VBV buffer model occupancy level $V_{status}$. When the targeted bit allocation $T_i$, $T_p$, or $T_b$ falls outside the limits, the process proceeds from the decision block 730 to a state 740 to bind the targeted bit allocation $T_i$, $T_p$, or $T_b$ to the limits. Otherwise, the process ends without further adjustment to the targeted bit allocation $T_i$, $T_p$, or $T_b$.

Equation 33 illustrates a sample computation for an upper limit $T_{max}$ for the targeted bit allocation $T_i$, $T_p$, or $T_b$. Equation 34 illustrates a sample computation for a lower limit $T_{min}$ for the targeted bit allocation $T_i$, $T_p$, or $T_b$.

$$T_{max} = V_{status} - V_{low} \quad (Eq. 33)$$

$$T_{min} = \max\left(V_{status} + \frac{bit\_rate}{picture\_rate} - V_{high}, 0\right) \quad (Eq. 34)$$

It will be understood that when the targeted bit allocation $T_i$, $T_p$, or $T_b$ exceeds the upper limit $T_{max}$, the targeted bit allocation $T_i$, $T_p$, or $T_b$ is reassigned the value of the upper limit $T_{max}$, and when the targeted bit allocation $T_i$, $T_p$, or $T_b$ is below the lower limit $T_{min}$, the targeted bit allocation $T_i$, $T_p$, or $T_b$ is reassigned the value of the lower limit $T_{min}$.

The application of the upper limit $T_{max}$ expressed in Equation 33 advantageously limits a relatively high value for the targeted bit allocation $T_i$, $T_p$, or $T_b$ such that the VBV buffer model occupancy level stays above the lower desired occupancy limit level $V_{low}$ for the VBV buffer model. The application of the lower limit $T_{min}$ expressed in Equation 34 advantageously limits a relatively low value for the targeted bit allocation $T_i$, $T_p$, or $T_b$ such that the buffer occupancy level stays below the upper desired occupancy limit level $V_{high}$, even after the accumulating data over time at the constant bit rate of the data channel. The lower limit $T_{min}$ corresponds to the higher of the quantities separated by the comma in the expression. Other values for the upper limit $T_{max}$ and for the lower limit $T_{min}$ will be readily determined by one of ordinary skill in the art. It will be understood that the targeted bit allocation $T_i$, $T_p$, or $T_b$ represents a target for the encoder to achieve and that there may be relatively small variances from the target and the number of bits actually used to encode a picture such that the buffer occupancy level $V_{status}$ may still deviate slightly from the desired occupancy limit levels $V_{low}$ and $V_{high}$.

After processing in the state 740, the adjustment process ends. For example, where the adjustment process depicted in FIG. 7 is incorporated in the state 610 of the rate control and quantization control process illustrated in FIG. 6, the process can continue processing from the state 610.

It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. For example, in one embodiment, the optional decision block 710 is not present. In another embodiment, the decision block 730 and the state 740 are optional and need not be present.

Macroblock Processing Sequence

Figures 8A, 8B:
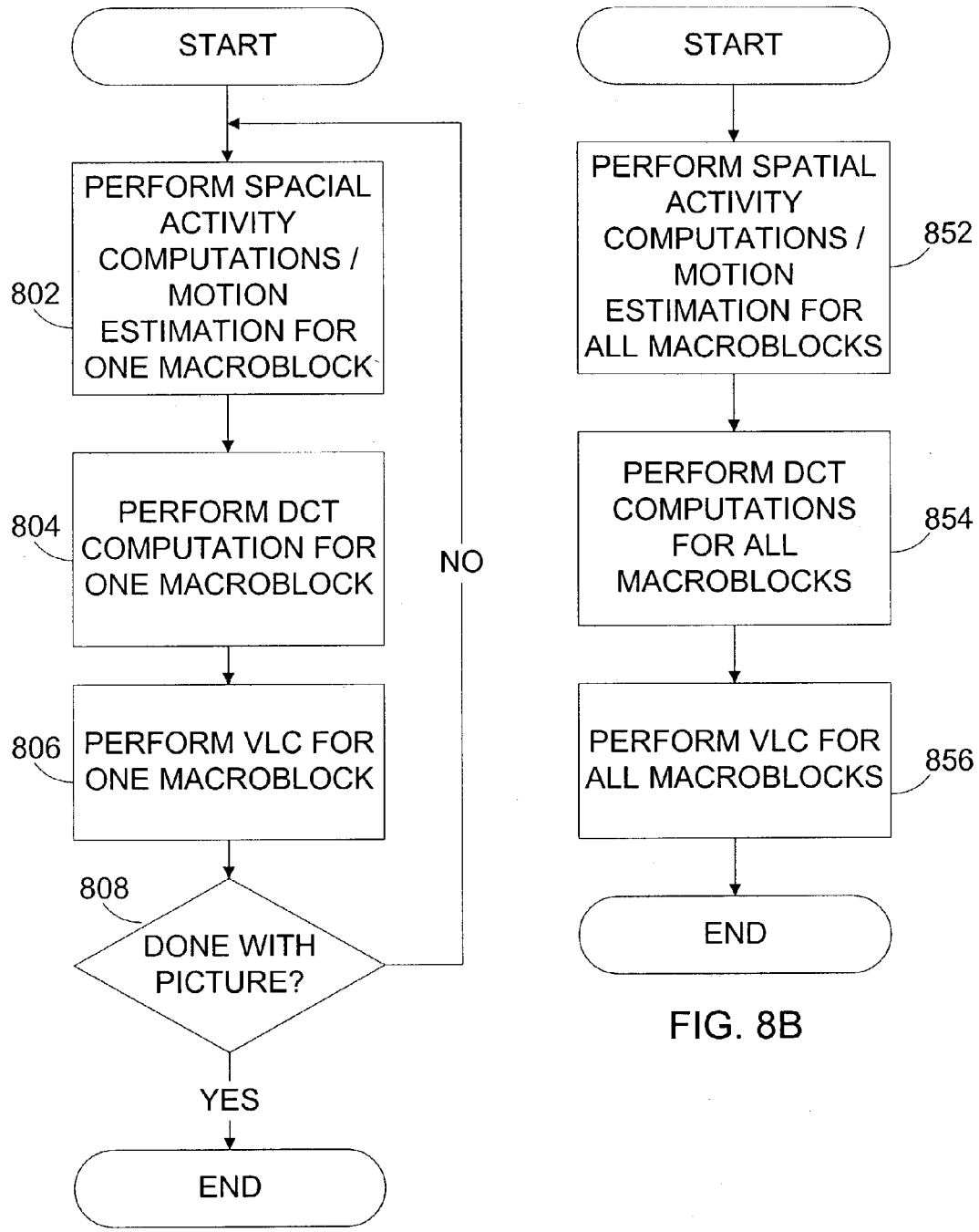
FIG. 8A is a flowchart that generally illustrates a sequence of processing macroblocks according to the prior art.
FIG. 8B is a flowchart that generally illustrates a sequence of processing macroblocks according to one embodiment.

FIG. 8A is a flowchart that generally illustrates a sequence of processing macroblocks according to the prior art. FIG. 8B is a flowchart that generally illustrates a sequence of processing macroblocks according to one embodiment. The processing sequence illustrated in FIG. 8B advantageously permits the spatial activity and/or motion activity for the macroblocks of a picture to be calculated such that actual values can be used in computations of sums and averages as opposed to estimates of sums and averages from computations of a prior picture.

The conventional sequence depicted in FIG. 8A starts at a state 802. In the state 802, the process performs a computation for spatial activity (texture) and/or for motion estimation for a single macroblock. The process advances from the state 802 to a state 804.

In the state 804, the process uses the computation of spatial activity and/or motion estimation to perform a discrete cosine transformation (DCT) of the macroblock. The computation of spatial activity is typically normalized with a total value of spatial activity. However, at this point in the process, the computations for spatial activity have not been completed for the picture that is being encoded. As a result, an estimate from a previous picture is used. For example, the total spatial activity from the prior picture is borrowed to compute an average. In another example, motion estimation from a previous picture can also be borrowed. Whether or not these estimates are close to the actual values is a matter of chance. When there is a scene change between the prior picture and the picture that is being encoded, the estimates can be quite inaccurate. These inaccuracies can impair picture quality and lead to mismatches between the number of bits targeted for encoding of the picture and the number of bits actually used to encode the picture. These variances in the number of bits consumed to encode a picture can disadvantageously lead to buffer underrun or to buffer overrun. The process advances from the state 804 to a state 806.

In the state 806, the process performs variable length coding (VLC) for the DCT coefficients of the macroblock. The VLC compresses the DCT coefficients. The process advances from the state 806 to a decision block 808.

In the decision block 808, the process determines whether it has completed encoding all the macroblocks in the picture. The process returns from the decision block 808 to the state 802 when there are macroblocks remaining to be encoded. Otherwise, the process proceeds to end until restarted.

A rearranged sequence according to one embodiment is depicted in FIG. 8b and starts at a state 852. In the state 852, the process performs computations for spatial activity and/or motion estimation for all the macroblocks in the picture that is being encoded. This advantageously permits sums and averages of the spatial activities and/or motion estimates to be advantageously computed with actual numbers and not with estimates, and is further advantageously accurate even with a scene change before the picture that is presently encoded. In another example of advantages, in TM5, an average of the spatial activity measures Savg_act$_j$ of 400 is used for the first picture as a "guess" of the measure. By processing the spatial activity of all the macroblocks before the spatial activities are used, the average of the spatial activity measures Savg_act$_j$ can be directly computed and a speculative "guess" can advantageously be avoided.

Further advantageously, the use of actual sums and averages permits the actual number of bits used to encode a picture to match with the targeted bit allocation with relatively higher accuracy. This advantageously decreases the chances of undesirable buffer underrun or buffer overrun and can increase picture quality. In one embodiment, the actual motion estimation for a macroblock is used to allocate bits among the macroblocks such that macroblocks with relatively high motion are allocated a relatively high number of bits. By contrast, in a conventional system with macroblock by macroblock processing, the bits for macroblocks are typically allocated among macroblocks by the relative motion of the macroblock in a prior picture, which may or may not be accurate. The process advances from the state 852 to a state 854.

In the state 854, the process performs the DCT computations for all of the macroblocks in the picture. The process advances from the state 854 to a state 856.

In the state 856, the process performs VLC for the DCT coefficients of all of the macroblocks in the picture. The process then ends until restarted.

In another embodiment, the process performs the computation of spatial activity and/or motion estimation for all the macroblocks as described in connection with the state 852, but then loops repetitively around a state to perform DCT computations and another state to perform VLC for macroblocks until processing of the macroblocks of the picture is complete.

Bit Stuffing

Bit stuffing or byte stuffing is a technique that is commonly used by an encoder to protect against generating a data stream that would otherwise lead to a decoder buffer overrun. When the number of bits that is used to encode a picture is relatively low for a sustained period of time, the decoder retrieves data from the decoder buffer at a slower rate than the rate at which the data channel adds data to the decoder buffer. When this accumulation of data continues for a sustained period of time such that the decoder buffer fills to capacity, data carried by the data channel can be lost. An example of a sequence of pictures that can be relatively highly compressed such that bit stuffing may be invoked is a sequence of pictures, where each picture is virtually completely black. To address this disparity in data rates such that buffer overrun does not occur, the encoder embeds data in the data stream that is not used, but consumes space. This process is known as bit stuffing.

Bit stuffing can be implemented in a variety of places in an encoding process. In one embodiment, bit stuffing is implemented when appropriate after the state 632 and before the state 636 in the encoding process described in connection with FIG. 6. In one embodiment, the encoding process invokes bit stuffing when the occupancy of the VBV buffer model attains a predetermined level, such as the $V_{high}$ level described earlier in connection with FIG. 7. In one embodiment, bit stuffing is invoked when the VBV buffer model occupancy is about 63/64 of the capacity of the VBV buffer model.

Though beneficial to resolving decoder buffer overrun problems, bit stuffing can introduce other problems to the encoding process. The inclusion of bits used in bit stuffing can also be an undesirable solution. The addition of bits used in bit stuffing in a computation for the number of bits used to encode a picture $S_{(i,p,b)}$ can indicate to the encoder that more bits are being used to encode the pictures than were initially targeted. This can further be interpreted as an indication to encode pictures with reduced quality to decrease the number of bits used to encode pictures. Over a period of time, this can lead to an even further decrease in the number of bits used to encode the pictures, with proportionally even more bits used in bit stuffing. With relatively many bits used in bit stuffing, relatively few bits remain to actually encode the pictures, which then reduces the quality of the encoded pictures over time.

Figure 9A:
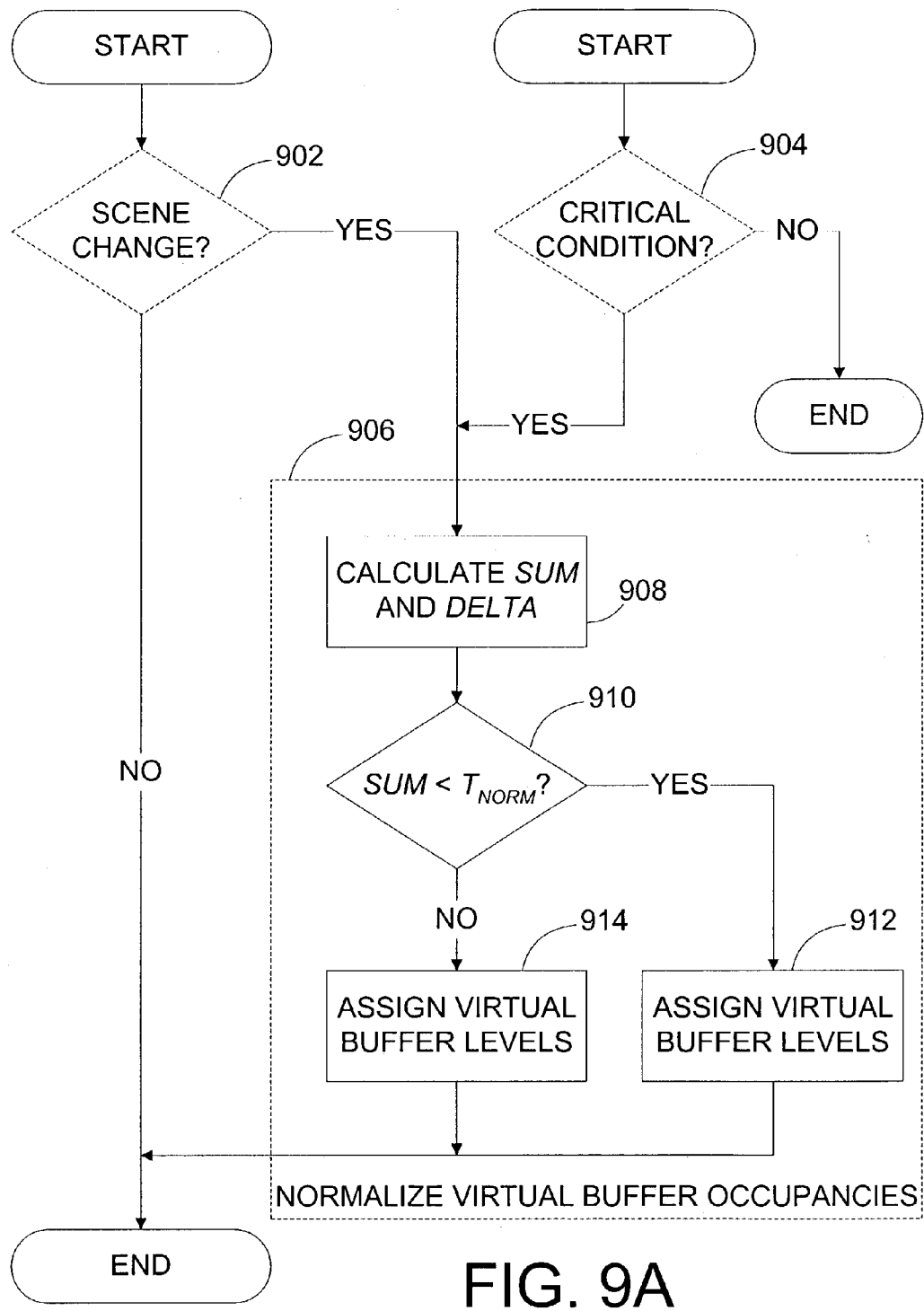
FIG. 9A is a flowchart that generally illustrates a process for stabilizing the encoding process from the deleterious effects of bit stuffing.

FIG. 9A illustrates a process that advantageously stabilizes the encoding process, thereby reducing or eliminating the tendency for bit stuffing to destabilize an encoding process and the tendency for the picture quality to degrade over time. As will be described later, the process depicted in FIG. 9A can be implemented in a variety of locations within an encoding process.

It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The process can begin at a decision block 902 or at a decision block 904. In one embodiment, only one of the decision block 902 or the decision block 904 is present in the process. In the illustrated embodiment, both the decision block 902 and the decision block 904 are present in the process. For example, the process can start at the decision block 902 prior to the encoding of a picture, and the process can start at the decision block 904 after the encoding of a picture. For example, the start of process of FIG. 9A at the decision block 902 can be incorporated after the state 612 and before the state 614 of the rate control and quantization control process described in connection with FIG. 6. In another example, the start of the process of FIG. 9A at the decision block 904 can be incorporated at the state 627 of the process of FIG. 6.

In the decision block 902, the process determines whether there has been a scene change between the picture that is being encoded and the previous picture encoded. The determination of a scene change can be performed prior to the encoding of a picture. In one embodiment, the decision block 902 is optional. A variety of methods can be used to determine whether there has been a scene change. In one embodiment, the process reuses the results of a computation that is used to encode the picture, such as the results of a sum of absolute differences (SAD) measurement. In one embodiment, scene change detection varies according to the picture type. In one embodiment, for I-pictures, the average spatial activity Sact_avg for the current picture is compared to the corresponding previous average spatial activity. For example, when the current activity is at least 2 times or less than half that of the previous I-picture, a scene change is detected. Other factors that can be used, such as 3 times and 1/3, 4 times and 1/4 or a combination of these will be readily determined by one of ordinary skill in the art. In addition, one embodiment imposes an additional criterion for a minimum number of pictures to pass since the previous scene change has been declared in order to declare a new scene change. For P-pictures, the average of motion activity can be used instead of the average spatial activity to detect a scene change, together with a relative comparison factor such as (2, 1/2), (3, 1/3), (4, 1/4) and the like. To increase the robustness of the decision, one embodiment further uses a minimum average motion activity measure for the current P picture, since average motion activity by itself can indicate relatively high motion, which can be attributed to a scene change. For example, values of minimum average motion activity measure in the range of about 1000 to about 4000 can be used to indicate relatively high motion The process proceeds from the decision block 902 to end such as, for example, by entering the state 614 when the process determines that there has been no scene change. In addition, it will be understood that there may be other portions of the encoding process which determine whether there has been a scene change, and where applicable, a previous determination can be reused in the decision block 902 by inspection of the state of a flag or semaphore indicating whether there has been a scene change. When the process determines that there has been a scene change, the process proceeds from the decision block to a sub-process 906.

In the decision block 904, the process determines whether the encoding process is in a critical state. In an alternate embodiment of the process, only one of the decision block 902 or the decision block 904 is present, and the other is optional. Where the decision block 904 is present in the process, the monitoring of the occupancy of the VBV buffer model can be invoked after the encoding of a picture. The criteria for determining that the encoding process is in a critical state can vary in a very broad range. In one embodiment, the critical state corresponds to when bit stuffing is performed by the encoding process when a value for the quantization parameter mquant$_j$ is not relatively low, such as not at its lowest possible value. The value for the quantization parameter mquant$_j$ that will correspond to relatively low values, such as the lowest possible value, will vary according to the syntax of the encoding standard. The process proceeds from the decision block 904 to the sub-process 906 when the occupancy of the VBV buffer model is determined to be in the critical state. Otherwise, the process proceeds to end such as, for example, by entering the state 627 of the process described in connection with FIG. 6.

In the sub-process 906, the process normalizes the virtual buffer occupancy values for the initial conditions as represented by the variables $d_0^i$, $d_0^p$, and $d_0^b$ described earlier in connection with the state 612. The normalized values can be computed by a variety of techniques. In the illustrated sub-process 906, the normalized values depend on the occupancy level of the VBV buffer model. The illustrated sub-process 906 includes a state 908, a decision block 910, a state 912, and a state 914.

In the state 908, one embodiment of the process calculates values for a sum and a delta as set forth in Equations 35 and 36a or 36b.

$$\text{sum} = d_0^i + d_0^p + d_0^b \quad \text{(Eq. 35)}$$

$$\text{delta} = vbv\_buffer\_size - V_{status} \quad \text{(Eq. 36a)}$$

$$\text{delta} = V_{initial} - V_{status} \quad \text{(Eq. 36b)}$$

For Equation 35, the values for the virtual buffer occupancy levels for the initial conditions can be obtained by application of Equations 9, 10, and 11 as described in greater detail earlier in connection with the state 612 of FIG. 6. As illustrated in Equations 36a and 36b, delta increases with a decreasing occupancy level in a buffer model. In Equation 36a, the variable vbv_buffer_size relates to the capacity of the VBV buffer model that is used for encoding. In Equation 36b, the variable $V_{initial}$ relates to an initialization value for the occupancy level of the VBV buffer model. In one embodiment, the value of $V_{initial}$ is about ⅞'s of the capacity of the VBV buffer model. In another embodiment, instead of $V_{initial}$, the process can use a target occupancy level such as $V_{target}$, but it should be noted that the initialization value and the target occupancy can be the same value. In another embodiment, delta can be based on a different quantity related to the size of the buffer model subtracted by the occupancy level of the buffer model. The size or capacity of the VBV buffer model can vary according to the standard that is used for encoding. For example, as described earlier in connection with FIG. 4, the MPEG-1 and the MPEG-2 encoding standards specify a VBV buffer size or about 40 kB and about 224 kB, respectively. Other standards can specify amounts of memory capacity for the VBV buffer model. The process advances from the state 908 to the decision block 910.

In the decision block 910, the process determines whether the value for sum is less than the value for a predetermined threshold $T_{norm}$. The value of the predetermined threshold $T_{norm}$ should correspond to some value that indicates a usable range. For example, one such value for the predetermined threshold $T_{norm}$ is zero. Other values will be readily determined by one of ordinary skill in the art. The process proceeds from the decision block 910 to the state 912 when the value for sum is less than the value $T_{norm}$. Otherwise, the process proceeds from the decision block 910 to the state 914.

The value for delta corresponds to the unoccupied space in the VBV buffer model for Equation 36a or to the discrepancy between the initial VBV buffer model status and the current VBV buffer model status in Equation 36b. It will be understood that other comparisons can be made between the sum of the virtual buffer levels and the unoccupied levels. For example, in another embodiment, a less than or equal to comparison can be made, an offset can be included, etc.

In the state 912, one embodiment of the process reassigns the virtual buffer occupancy values for the initial conditions $d_0^i$, $d_0^p$, and $d_0^b$ with normalized values according to Equations 37, 38, and 39.

$$d_0^i = \text{delta} \cdot fr^i \quad \text{(Eq. 37)}$$

$$d_0^p = \text{delta} \cdot fr^p \quad \text{(Eq. 38)}$$

$$d_0^b = \text{delta} \cdot fr^b \quad \text{(Eq. 39)}$$

In Equations 37, 38, and 39, the value for delta can be calculated from Equation 36, and the values for $fr^i$, $fr^p$, and $fr^b$ can vary in a very broad range. The values for $fr^i$, $fr^p$, and $fr^b$ will typically range between 0 and 1 and can be the same value or different values. Further, in one embodiment, the values for $fr^i$, $fr^p$, and $fr^b$ are selected such that they sum to a value of approximately 1, such as the value of 1. In one embodiment, the values for $fr^i$, $fr^p$, and $fr^b$ correspond to about 5/17, about 5/17, and about 7/17, respectively. Other values for $fr^i$, $fr^p$, and $fr^b$ will be readily determined by one of ordinary skill in the art. The process can then end by, for example, entering the state 614 of the process described in connection with FIG. 6.

Returning to the state 914, at this point in the process, the process has determined that the value for sum is not less than the value for $T_{norm}$. In the state 914, one embodiment of the process reassigns the values of the virtual buffer occupancy variables for the initial conditions $d_0^i$, $d_0^p$, and $d_0^b$ with normalized values according to Equations 40, 41, and 42.

$$d_0^i = d_0^i \cdot \frac{\text{delta}}{\text{sum}} \quad \text{(Eq. 40)}$$

$$d_0^p = d_0^p \cdot \frac{\text{delta}}{\text{sum}} \quad \text{(Eq. 41)}$$

$$d_0^b = d_0^b \cdot \frac{\text{delta}}{\text{sum}} \quad \text{(Eq. 42)}$$

Equations 40, 41, and 42 correspond to assignment statements for the values of the virtual buffer occupancy variables for the initial conditions $d_0^i$, $d_0^p$, and $d_0^b$. The values to the right of the "=" correspond to the values before adjustment, and the values to the left of the "=" correspond to the values after adjustment. It will be observed that when the value for delta and the value for sum are approximately the same, that relatively little adjustment to the values occurs. When the value for sum is relatively high compared to the value for delta, the values of the virtual buffer occupancy variables for the initial conditions $d_o^i$, $d_o^p$, and $d_o^b$ are reduced proportionally. It should also be noted that relatively small values can also be added to the value of sum used in Equations 40–42 to prevent division by zero problems. After adjustment, the process ends by, for example, proceeding to the state 614 of the process described earlier in connection with FIG. 6.

Figure 9B:
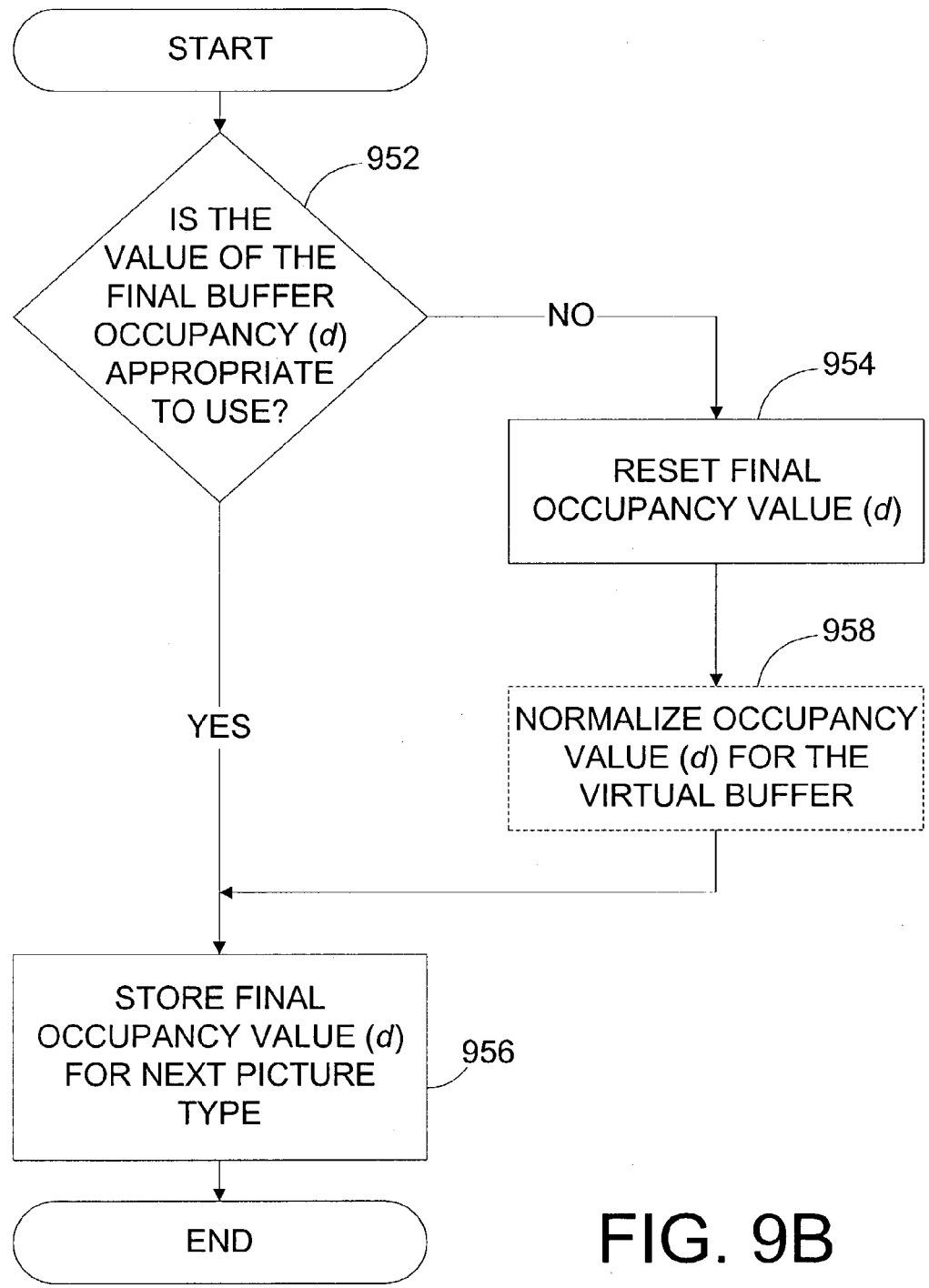
FIG. 9B is a flowchart that generally illustrates a process for resetting virtual buffer occupancy levels upon the detection of an irregularity in a final buffer occupancy level.

FIG. 9B is a flowchart that generally illustrates a process for resetting virtual buffer occupancy levels upon the detection of an irregularity in a final buffer occupancy level. The process for resetting can be incorporated into encoding processes, such as in the state 627 of the rate control and quantization control process described earlier in connection with FIG. 6.

The process begins at a decision block 952. As explained earlier in connection with the state 627 of the rate control and quantization control process described in connection with FIG. 6, the final occupancy (fullness) of the applicable virtual buffer, i.e., the value of $d_j^i$, $d_j^p$ or $d_j^b$, where j=MB_cnt, can be used as the initial condition for the encoding of the next picture of the same type, i.e., as the value for $d_o^i$, $d_o^p$, or $d_o^b$ for the picture of the same type (I, P, or B). When encoding via the process described in TM5, the final occupancy of the applicable virtual buffer, i.e., the value of $d_j^i$, $d_j^p$, or $d_j^b$, is always used as the initial condition for the encoding of the next picture of the same type. However, the final occupancy of the applicable virtual buffer is not always an appropriate value to use.

In the decision block 952, the process determines whether the final occupancy of the applicable virtual buffer, i.e., the value of $d_j^i$, $d_j^p$, or $d_j^b$, is appropriate to use. In one embodiment, the appropriateness of a value is determined by whether the value is physically possible. A virtual buffer models a physical buffer. A physical buffer can be empty, can be partially occupied with data, or can be fully occupied with data. However, a physical buffer cannot hold a negative amount of data. To distinguish between physically attainable values and non-physically attainable values, one embodiment of the process compares the value for the final occupancy of the applicable virtual buffer to a predetermined threshold tr.

In one embodiment, the value of tr is zero to distinguish between a physically attainable buffer occupancy and a buffer occupancy that is not physically attainable. In one embodiment, a value that is relatively close to zero is used. Although the value of tr can correspond to a range of values, including values near to zero such as one, two, three, etc., the value of tr should not permit a negative value for the final occupancy to be deemed appropriate. It will be understood that when the value used for tr is zero, the process can distinguish between physically attainable values and non-physically attainable values by inspecting the sign, i.e., positive or negative, associated with the value of the final occupancy of the applicable virtual buffer. It will also be understood that when integer comparisons are made, a comparison using an inequality such as greater than negative one, i.e., >−1, can also be used, such that a value for tr can correspond to −1. The process proceeds from the decision block 952 to a state 954 when the final occupancy value is not appropriate to use as an initial condition for the next picture of the same type. Otherwise, the process proceeds from the decision block 952 to a state 956.

In the state 954, the process resets the final buffer occupancy value for the picture type that had just been encoded $d_j^i$, $d_j^p$, or $d_j^b$, where j=MB_cnt, to an appropriate value, such as a physically attainable value. Appropriate values can include any value from zero to the capacity of the applicable virtual buffer. In one embodiment, the final buffer occupancy value is reset to a relatively low value that is near zero, such as zero itself. The process can advance from the state 954 to an optional state 958, or the process can advance from the state 954 to the state 956.

In the optional state 958, the process normalizes the virtual buffer occupancy values $d_j^i$, $d_j^p$, and $d_j^b$. In the prior state 954, the process had corrected for a non-physically attainable value in the virtual occupancy value $d_j^i$, $d_j^p$, or $d_j^b$, that applies to the type of picture that was encoded. For example, the process can take the prior negative value of the applicable virtual occupancy value $d_j^i$, $d_j^p$, or $d_j^b$, and allocate the negative value to the remaining virtual occupancy values such that the sum of the virtual occupancy values $d_j^i$, $d_j^p$, and $d_j^b$, sums to zero. For example, in one embodiment, the process adds half of the negative value to each of the two other virtual occupancy values. The process advances from the optional state 958 to the state 956.

In the state 956, the process stores the final virtual buffer occupancy value as reset by the state 954 or unmodified via the decision block 952 and ends. The process can end by, for example, proceeding to the state 619 of the rate control and quantization control process described earlier in connection with FIG. 6.

Scene Change within a Group of Pictures

FIG. 10A illustrates examples of groups of pictures. Scene changes between pictures of a sequence can exist within a group of pictures. Scene changes are relatively commonly encountered in a sequence of pictures. The scene changes can result from a change in camera shots, a switching between programs, a switch to a commercial, an edit, and the like. With a scene change, the macroblocks of a present picture bear little or no relation to the macroblocks of a previous picture, so that the macroblocks of the present picture will typically be intra coded, rather than predictively coded. Since an I-picture includes only intra-coded macroblocks, scene changes are readily accommodated with I-pictures.

Although pictures corresponding to scene changes are preferably coded with I-pictures, the structure of a group of pictures, i.e., the sequence of picture types, can be predetermined in some systems or outside of the control of the encoder. For example, one direct broadcast satellite (DBS) system has a predetermined pattern of I-pictures, P-pictures, and B-pictures that is followed by the encoder. As a result, scene changes can occur in B-pictures or in P-pictures. A conventional encoder can accommodate scene changes in B-pictures by referencing the predictive macroblocks of the B-picture to an I-picture or to a P-picture that is later in time.

A scene change in a P-picture can be problematic. A P-picture can include intra-coded macroblocks and can include predictively-coded macroblocks. However, a P-picture cannot reference a picture that is later in time, so that the scene change will typically be encoded using only intra-coded macroblocks. In substance, a scene change P-picture in a conventional encoder is an I-picture, but with the bit allocation and the header information of a P-picture. In a conventional encoder, a P-picture is allocated fewer bits than an I-picture so that the picture quality of a scene change P-picture is noticeably worse than for an I-picture. Other pictures, such as B-pictures and other P-pictures, can be predictively coded from the P-picture with the scene change, thereby disadvantageously propagating the relatively low picture quality of the scene change P-picture.

As described earlier in connection with FIGS. 1 and 5, the pictures of a sequence are arranged into groups of pictures.

A group starts with an I-picture and ends with the picture immediately prior to a subsequent I-picture. The pictures within a group of pictures can be arranged in a different order for presentation and for encoding. For example, a first group of pictures 1002 in a presentation order is illustrated in FIG. 10A. An I-picture 1004 for a next group of pictures is also shown in FIG. 10A.

The pictures of a sequence can be rearranged from the presentation order when encoding and decoding. For example, the first group of pictures 1002 can be rearranged to a second group of pictures 1010, where the group is a first group of a sequence, and can be rearranged to a third group of pictures 1020, where the group is an ongoing part of the sequence. The second group of pictures 1010 and the third group of pictures 1020 are illustrated in encoding order. The end of the second group of pictures 1010 occurs when an I-picture 1012 from another group is encountered. Due to the reordering, two B-pictures 1014, 1016 that were originally in the first group of pictures 1002 in the presentation order are now no longer in the group of pictures as rearranged for encoding. With respect to the process described in connection with FIG. 10B, a group of pictures relates to a group in an encoding order.

Figure 10B:
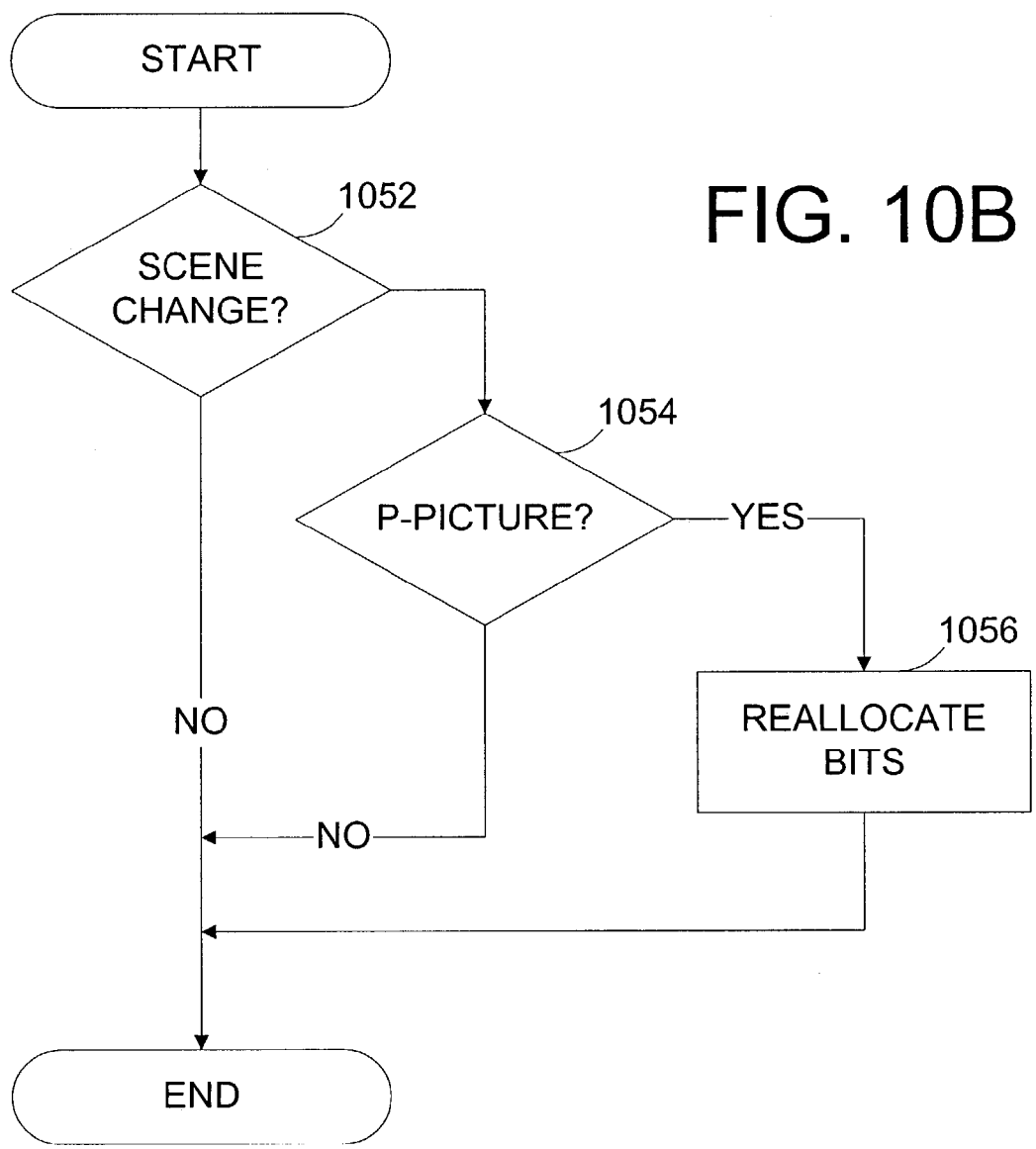
FIG. 10B is a flowchart that generally illustrates a process for resetting encoding parameters upon the detection of a scene change within a group of pictures (GOP).

The third group of pictures 1020 will be used to describe the process illustrated in FIG. 10B. The third group of pictures 1020 includes two pictures 1022, 1024 that will be presented before the I-picture 1026 of the third group of pictures 1020. In the illustrated example, a scene change occurs in the third group of pictures 1020 at a P-picture 1030 within the third group of pictures 1020. The process described in FIG. 10B advantageously recognizes the scene change and reallocates the remaining bits for the remaining pictures 1032 in the third group of pictures 1020 to improve picture quality.

FIG. 10B is a flowchart that generally illustrates a process for resetting encoding parameters upon the detection of a scene change within a group of pictures (GOP). In the illustrated embodiment of the process, the encoding order is used to describe the grouping of groups of pictures.

The process illustrated in FIG. 10B identifies scene-change P-pictures and advantageously reallocates bits within the remaining pictures of the group of pictures without changing the underlying structure of the group of pictures. The process advantageously allocates relatively more bits to the scene change P-picture, thereby improving picture quality. The illustrated process can be incorporated into the rate control and quantization control process described earlier in connection with FIG. 6. For example, the process of FIG. 10B can be incorporated before the state 610 of FIG. 6. The skilled practitioner will appreciate that the illustrated process can be modified in a variety of ways without departing from the spirit and scope of the invention. For example, in another embodiment, various portions of the illustrated process can be combined, can be rearranged in an alternate sequence, can be removed, and the like.

The process begins at a decision block 1052. In the decision block 1052, the process determines whether there has been a scene change or a relatively sudden increase in an amount of motion in a picture. The scene change can be determined by a variety of techniques. In one embodiment, the process makes use of computations of picture comparisons that are already available. For example, one embodiment of the process uses a sum of absolute differences (SAD) measurement. The SAD measurement can be compared to a predetermined value, to a moving average, or to both to determine a scene change. For example, a SAD measurement that exceeds a predetermined level, or a SAD measurement that exceeds double the moving average of the SAD can be used to detect a scene change. Advantageously, the SAD measurement can detect a scene change or a sudden increase in an amount of motion in a picture. It will be understood that there may be another portion of the encoding process that also monitors for a scene change, and in one embodiment, the results of another scene change detection is reused in the decision block 1052. The process proceeds from the decision block 1052 to a decision block 1054 when a scene change is detected. Otherwise, the process proceeds to end, such as, for example, entering the state 610 of the rate control and quantization control process described earlier in connection with FIG. 6.

In the decision block 1054, the process determines whether the type of the picture to be encoded corresponds to the P-type. In another embodiment, the order of the decision block 1052 and the decision block 1054 are interchanged from that shown in FIG. 10B. The process proceeds from the decision block 1054 to a state 1056 when the picture is to be encoded as a P-picture. Otherwise, the process proceeds to end by, for example, entering the state 610 of the rate control and quantization control process described earlier in connection with FIG. 6.

In the state 1056, the process reallocates bits among the remaining pictures of the group of pictures. Using the third group of pictures 1020 of FIG. 10A as an example, when a scene change is detected at the P-picture 1030, the remaining bits R are advantageously reallocated among the remaining pictures 1032. In one embodiment, the process encodes the remaining pictures 1032 as though the P-picture 1030 is an I-picture, but without altering the structure of the group of pictures by not changing the type of picture of the P-picture 1030.

The process for encoding the P-picture 1030 as though it is an I-picture can be performed in a number of ways. For example, one embodiment of the process effectively decrements the number of P-pictures $N_p$ to be encoded before the P-picture with the scene change is encoded, and uses the decremented value of $N_p$ in Equation 6 to generate a targeted bit allocation. Equation 6, which is used in a conventional system only to calculate a targeted bit allocation $T_i$ for a I-picture, can be used by the process of FIG. 10B to calculate a targeted bit allocation for the P-picture with the scene change. Equation 43 illustrates an expression of such a targeted bit allocation, expresses as $T_{p'}$.

$$T_{p'} = \max\left\{\left(\frac{R}{\left(1 + \frac{(N_p - 1)X_p}{X_i K_p} + \frac{N_b X_b}{X_i K_b}\right)}\right), \left(\frac{\text{bit\_rate}}{8 \cdot \text{picture\_rate}}\right)\right\} \quad \text{(Eq. 43)}$$

This advantageously allocates to the P-picture a relatively large number of bits, such that the P-picture with the scene change can encode the scene change with relatively high quality. Equations 7 and 8 can then be used for the subsequent encoding of P-pictures and B-pictures that remain to be encoded in the group of pictures. Optionally, the process can further reset the values for the complexity estimators $X_i$, $X_p$, and $X_b$ in response to the scene change by, for example, applying Equations 1–3 described earlier in connection with the state 608 of the rate control and quantization control process of FIG. 6. The process then ends by, for example, proceeding to the state 610 of the rate control and quantization control process. It will be understood that the process described in connection with FIGS. 10A and 10B can be repeated when there is more than one scene change in a group of pictures.

Selective Skipping of Macroblocks in B-Pictures

Figure 11:
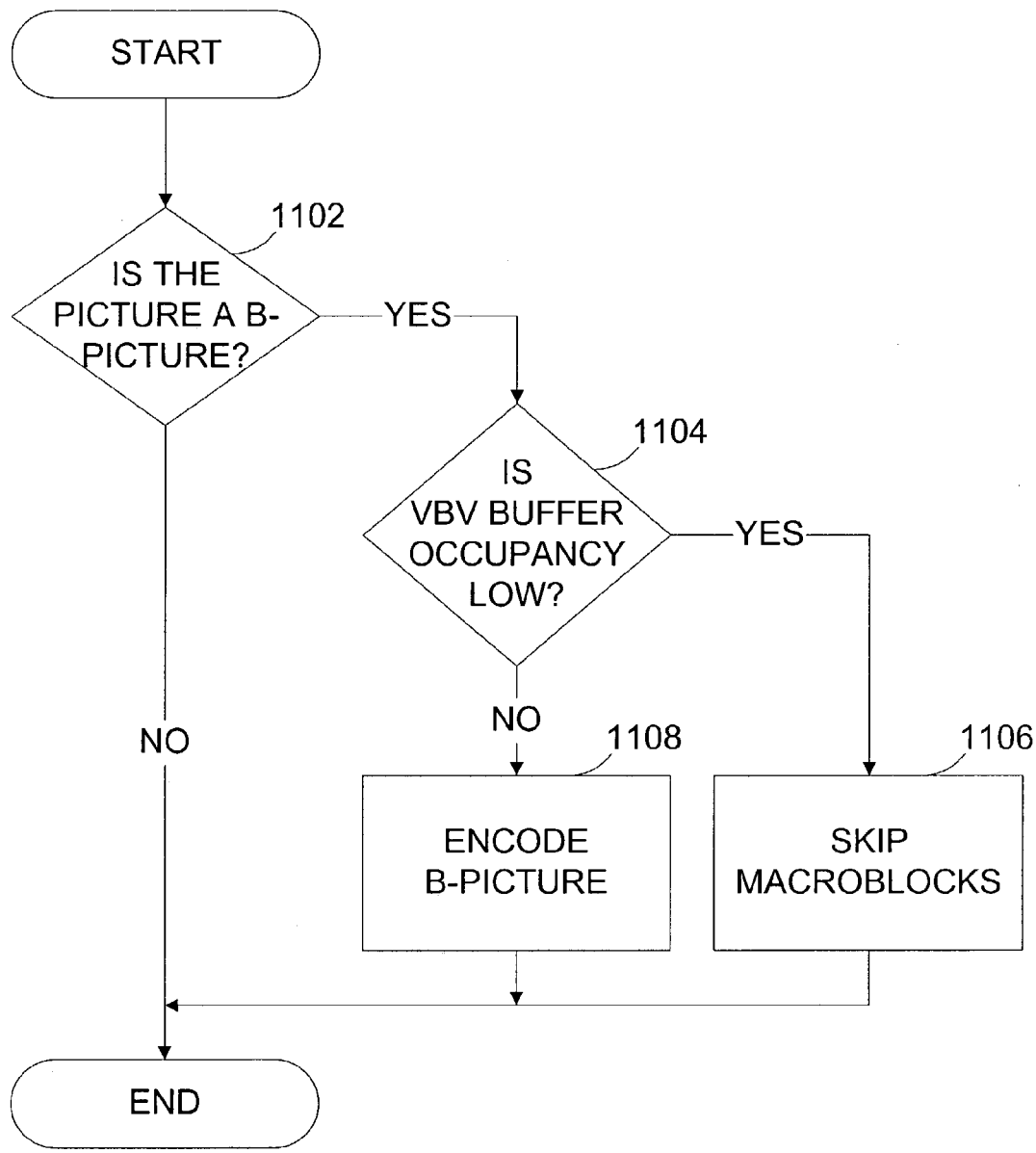
FIG. 11 is a flowchart that generally illustrates a process for the selective skipping of data in a video encoder to reduce or eliminate the occurrence of decoder buffer underrun.

FIG. 11 is a flowchart that generally illustrates a process for the selective skipping of data in a video encoder. This selective skipping of data advantageously permits the video encoder to maintain relatively good bit rate control even in relatively extreme conditions. The selective skipping of data permits the video encoder to produce encoded data streams that advantageously reduce or eliminate relatively low occupancy levels in a decoder buffer, such as decoder buffer underrun. Decoder buffer underrun can occur when the playback bit rate exceeds the relatively constant bit rate of the data channel for a sustained period of time such that the decoder buffer runs out of data. Decoder buffer underrun is quite undesirable and results in a discontinuity such as a pause in the presentation.

Even without an occurrence of decoder buffer underrun, data streams that result in relatively low decoder buffer occupancy levels can be undesirable. As explained earlier in connection with FIG. 4, a buffer model, such as the VBV buffer model, is typically used in an encoding process to model the occupancy levels of a decoder buffer. When a conventional encoder determines that the occupancy level of the buffer model is dangerously low, the conventional encoder can severely compromise picture quality in order to conserve encoding bits and maintain bit rate control. The effects of relatively low VBV buffer model occupancy levels is noticeable in the severely degraded quality of macroblocks.

The process generally illustrated by the flowchart of FIG. 11 advantageously skips the encoding of selected macroblocks when relatively low buffer model occupancy levels are detected, thereby maintaining relatively good bit rate control by decreasing the number of bits used to encode the pictures in a manner that does not impact picture quality as severely as conventional techniques. In one example, the process illustrated in FIG. 11 can be incorporated in the state 623 of the rate control and quantization control process described earlier in connection with FIG. 6. The skilled practitioner will appreciate that the illustrated process can be modified in a variety of ways without departing from the spirit and scope of the invention. For example, in another embodiment, various portions of the illustrated process can be combined, can be rearranged in an alternate sequence, can be removed, and the like.

The process starts at a decision block 1102, where the process determines whether the picture designated to be encoded corresponds to a B-picture. B-pictures can be encoded with macroblocks that are predictively coded based on macroblocks from other pictures (I-pictures or P-pictures) that are earlier in time or later in time in the presentation order. However, during the encoding process, the pictures (I-pictures or P-pictures) that are used to encode a B-picture are encoded prior to the encoding of the B-picture. The process proceeds from the decision block 1102 to a decision block 1104 when the picture to be encoded is a B-picture. Otherwise, the process proceeds to end, by, for example, returning to the state 623 of the process described earlier in connection with FIG. 6.

In the decision block 1104, the process determines whether the VBV buffer occupancy level is relatively low. During the encoding process, a relatively large number of bits may have already been consumed in the encoding of the pictures from which a B-picture is to be encoded. In some circumstances, this consumption of data can lead to a low VBV buffer occupancy level. For example, the process can monitor the occupancy level $V_{status}$ of the VBV buffer model, which was described earlier in connection with FIG. 7, and compare the occupancy level $V_{status}$ to a predetermined threshold, such as to $V_{critical}$. The comparison can be made in a variety of points in the encoding process. In one embodiment, the comparison is made after a picture has been encoded and after the VBV buffer model occupancy level has been determined, such as after the state 638 or after the state 610 of the rate control and quantization control process described earlier in connection with FIG. 6. In one embodiment, the comparison is advantageously made before any of the macroblocks in the picture have been encoded, thereby advantageously preserving the ability to skip all of the macroblocks in the picture when desired to conserve a relatively large amount of bits.

In one example, $V_{critical}$ is set to about ¼ of the capacity of the VBV buffer model. It should be noted that the capacity of the VBV buffer model or similar buffer model can vary with the encoding standard. It will be understood that an appropriate value for $V_{critical}$ can be selected from within a broad range. For example, other values such as ¹⁄₁₆, ⅛, ¹⁄₁₀, and ³⁄₁₆ of the capacity of the VBV buffer model can also be used. Other values will be readily determined by one of ordinary skill in the art. In one embodiment, the process permits the setting of $V_{critical}$ to be configured by a user. The process proceeds from the decision block 1104 to a state 1106 when the occupancy level $V_{status}$ of the VBV buffer model falls below the predetermined threshold. Otherwise, the process proceeds from the decision block 1104 to a state 1108.

In the state 1106, the process skips macroblocks in the B-picture. In one embodiment, all the macroblocks are skipped. In another embodiment, selected macroblocks are skipped. The number of macroblocks skipped can be based on, for example, the occupancy level $V_{status}$ of the VBV buffer. Data for an "encoded" B-picture is still formed, but with relatively little data for the skipped macroblocks. In the encoding process, a bit or flag in the data stream indicates a skipped macroblock. For example, in a technique known as "direct mode," a flag indicates that the skipped macroblock is to be interpolated during decoding between the macroblocks of a prior and a later (in presentation time) I- or P-picture. Another flag indicates that the skipped macroblock is to be copied from a macroblock in a prior in presentation time I- or P-picture. Yet another flag indicates that the skipped macroblock is to be copied from a macroblock in a later in presentation time I- or P-picture. The skipping of macroblocks can advantageously encode a B-picture in relatively few bits. In one example, a B-picture for MPEG-2 with all the macroblocks skipped can advantageously be encoded using only about 300 bits. After the skipping of macroblocks for the B-picture is complete, the process ends by, for example, returning to the state 623 of the process described earlier in connection with FIG. 6.

In the state 1108, the process has determined that the occupancy level $V_{status}$ of the VBV buffer is not relatively low, and the process encodes the macroblocks in the B-picture. After the encoding of the macroblocks for the B-picture is complete, the process ends by, for example, returning to the state 623 of FIG. 6. It will be understood that the decisions embodied in the decision block 1102 and/or the decision block 1104 can be performed at a different point in the process of FIG. 6 than the state 1106 or the state 1108.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method for allocating bits in a video encoding process, the method comprising:
   receiving an indication for a group of pictures for encoding, wherein the indication includes a structure indicating picture types for the pictures in the group of pictures;
   comparing a picture in the group of pictures to a previous picture in the group of pictures, the picture having bits allocated thereto for encoding;
   determining from the comparison that a scene change has occurred in the group of pictures at the picture;
   determining whether the picture is a P-picture; and
   reallocating bits for encoding remaining pictures in the group of pictures in response to the determination that there has been a scene change at the picture and that the picture is a P-picture, wherein such reallocation occurs without changing the structure of picture types, and the reallocated bits are allocated to the P-picture with the scene change according to:

$$T_{p'} = \max\left\{\left(\frac{R}{\left(1 + \frac{(N_p - 1)X_p}{X_i K_p} + \frac{N_b X_b}{X_i K_b}\right)}\right), \left(\frac{bit\_rate}{8 \cdot picture\_rate}\right)\right\}$$

where $T_{p'}$ corresponds to the reallocation bits for the P-picture, where R corresponds to a remaining number of bits reallocated to the group of pictures, where $N_p$ corresponds to a number of P-pictures remaining to be encoded in the group, where $N_b$ corresponds to a number of B-pictures remaining to be encoded in the group, where bit_rate corresponds to a constant bit rate at which data is transmitted in a data channel, where picture_rate corresponds to a rate at which pictures are presented, where $X_i$, $X_p$, and $X_b$ correspond to constant bit rate complexity estimators respectively for I-pictures, for P-pictures, and for B-pictures, and where $K_p$ and $K_b$ are values determined by quantization matrices used to encode the pictures.

2. The method as defined in claim 1, wherein the previous picture is determined by encoding order and not by presentation order.

3. The method as defined in claim 1, wherein the video encoding process is performed in real time.

4. The method as defined in claim 1, wherein the video encoding process is adapted to encode video for transmission over a constant-bit-rate data channel.

5. The method as defined in claim 1, wherein comparing is performed by computing a sum of absolute differences (SAD) measurement.

6. The method as defined in claim 1, wherein comparing further comprises reusing the results of a comparison between pictures that has already been performed in connection with a motion estimation task.

7. The method as defined in claim 1, wherein reallocating bits among the remaining pictures further comprises allocating more bits to the P-picture with the scene change than were originally allocated and allocating fewer bits to the other pictures in the remaining pictures than were originally allocated.

8. The method as defined in claim 1, wherein reallocating bits further comprises allocating bits to the P-picture with the scene change as if the P-picture were an I-picture.

9. The method as defined in claim 1, further comprising resetting complexity estimators $X_i$, $X_p$, and $X_b$ upon the detection of the scene change in the P-picture.

10. A method for allocating bits in a real-time video encoding process, the method comprising:
    detecting a scene change in a P-picture of a group of pictures, the P-picture having bits allocated thereto; and
    reallocating bits in response to the detection of the scene change, where the reallocation excludes changing a type of picture in the group of pictures, and the bits are reallocated to the P-picture with the scene change according to:

$$T_{p'} = \max\left\{\left(\frac{R}{\left(1 + \frac{(N_p - 1)X_p}{X_i K_p} + \frac{N_b X_b}{X_i K_b}\right)}\right), \left(\frac{bit\_rate}{8 \cdot picture\_rate}\right)\right\}$$

where $T_{p'}$ corresponds to the reallocation bits for the P-picture, where R corresponds to a remaining number of bits reallocated to the group of pictures, where $N_p$ corresponds to a number of P-pictures remaining to be encoded in the group, where $N_b$ corresponds to a number of B-pictures remaining to be encoded in the group, where bit_rate corresponds to a constant bit rate at which data is transmitted in a data channel, where picture_rate corresponds to a rate at which pictures are presented, where $X_i$, $X_p$, and $X_b$ correspond to constant bit rate complexity estimators respectively for I-pictures, for P-pictures, and for B-pictures, and where $K_p$ and $K_b$ are values determined by quantization matrices that are used to encode the pictures.

11. The method as defined in claim 10, wherein the P-picture is reallocated with an amount of bits that would have been allocated had the P-picture been an I-picture.

12. A computer readable medium encoded with computer executable instructions in the form of a computer program for allocating bits in a video encoding process, that:
    receives an indication for a group of pictures for encoding, wherein the indication includes a structure indicating picture types for the pictures in the group of pictures;
    allocates a target number of bits for a picture in the group of pictures;
    compares the picture in the group of pictures to a previous picture in the group of pictures;
    determines from the comparison to determine that a scene change has occurred in the group of pictures at the picture;
    determines that the picture is a P-picture; and
    reallocates bits for encoding remaining pictures in the group of pictures in response to the determination that there has been a scene change at the picture and that the picture is a P-picture, wherein such reallocation occurs without changing the structure of picture types, and the bits are allocated to the P-picture with the scene change according to:

$$T_{p'} = \max\left\{\left(\frac{R}{\left(1 + \frac{(N_p - 1)X_p}{X_i K_p} + \frac{N_b X_b}{X_i K_b}\right)}\right), \left(\frac{bit\_rate}{8 \cdot picture\_rate}\right)\right\}$$

where $T_{p'}$ corresponds to the reallocation bits for the P-picture, where R corresponds to a remaining number of bits reallocated to the group of pictures, where $N_p$ corresponds to a number of P-pictures remaining to be encoded in the group, where $N_b$ corresponds to a number of B-pictures remaining to be encoded in the group, where bit_rate corresponds to a constant bit rate at which data is transmitted in a data channel, where picture_rate corresponds to a rate at which pictures are presented, where $X_i$, $X_p$, and $X_b$ correspond to constant bit rate complexity estimators respectively for I-pictures, for P-pictures, and for B-pictures, and where $K_p$ and $K_b$ are values determined from quantization matrices used to encode the pictures.

13. A circuit adapted to allocate bits in a video encoding process comprising:
 a module adapted to receiving an indication for a group of pictures for encoding, wherein the indication includes a structure indicating picture types for the pictures in the group of pictures;
 a module adapted to compare a picture in the group of pictures to a previous picture in the group of pictures, the picture having bits for encoding allocated thereto;
 a module adapted to determine whether a scene change has occurred in the group of pictures at the picture;
 a module adapted to determine whether the picture is a P-picture; and
 a module adapted to reallocate bits for encoding remaining pictures of the group of pictures in response to the determination that there has been a scene change at the picture and that the picture is a P-picture, wherein such reallocation occurs without changing the structure of picture types, and the bits are reallocated to the P-picture with the scene change according to:

$$T_{p'} = \max\left\{\left(\frac{R}{\left(1 + \frac{(N_p - 1)X_p}{X_i K_p} + \frac{N_b X_b}{X_i K_b}\right)}\right), \left(\frac{bit\_rate}{8 \cdot picture\_rate}\right)\right\}$$

where $T_{p'}$ corresponds to the reallocation bits for the P-picture, where R corresponds to a remaining number of bits reallocated to the group of pictures, where $N_p$ corresponds to a number of P-pictures remaining to be encoded in the group, where $N_b$ corresponds to a number of B-pictures remaining to be encoded in the group, where bit_rate corresponds to a constant bit rate at which data is transmitted in a data channel, where picture_rate corresponds to a rate at which pictures are presented, where $X_i$, $X_p$, and $X_b$ correspond to constant bit rate complexity estimators respectively for I-pictures, for P-pictures, and for B-pictures, and where $K_p$ and $K_b$ are values determined from quantization matrices used to encode the pictures.

14. A video encoder that embodies the circuit of claim 13.

* * * * *